United States Patent
Tavildar et al.

(10) Patent No.: US 10,524,282 B2
(45) Date of Patent: Dec. 31, 2019

(54) SCHEDULING ASSIGNMENT CONTENT AND TRANSMISSION IN WIRELESS COMMUNICATIONS

(71) Applicant: QUALCOMM Incorporated, San Diego, CA (US)

(72) Inventors: Saurabha Rangrao Tavildar, Jersey City, NJ (US); Sudhir Kumar Baghel, Bridgewater, NJ (US); Shailesh Patil, North Wales, PA (US); Kapil Gulati, Long Branch, NJ (US)

(73) Assignee: QUALCOMM Incorporated, San Diego, CA (US)

(*) Notice: Subject to any disclaimer, the term of this patent is extended or adjusted under 35 U.S.C. 154(b) by 266 days.

(21) Appl. No.: 14/608,851

(22) Filed: Jan. 29, 2015

(65) Prior Publication Data

US 2015/0271840 A1 Sep. 24, 2015

Related U.S. Application Data

(60) Provisional application No. 61/955,674, filed on Mar. 19, 2014.

(51) Int. Cl.
*H04W 72/12* (2009.01)
*H04W 28/02* (2009.01)
(Continued)

(52) U.S. Cl.
CPC .......... *H04W 72/1263* (2013.01); *H04L 1/00* (2013.01); *H04L 1/0026* (2013.01);
(Continued)

(58) Field of Classification Search
CPC ... H04W 28/021; H04W 84/18; H04W 84/22; H04W 76/023; H04W 76/043; H04W 72/1278
See application file for complete search history.

(56) References Cited

U.S. PATENT DOCUMENTS

2005/0083924 A1* 4/2005 Dillinger ............. G06F 11/1433
　　　　　　　　　　　　　　　　　　　　　　　370/389
2009/0280823 A1* 11/2009 Petrovic ................ H04W 68/02
　　　　　　　　　　　　　　　　　　　　　　　455/453
(Continued)

FOREIGN PATENT DOCUMENTS

EP　　　　3087795 A1 * 11/2016 ............ H04W 72/04
WO　　WO-2015115505 A1　8/2015

OTHER PUBLICATIONS

Author Unknown, Overview of D2D functions and standardization impact, 3GPP TSG RAN WG1 Meeting #76, Doc. No. R1-140771, Feb. 14, 2014, pp. 1-7.*

(Continued)

*Primary Examiner* — Christopher M Crutchfield
(74) *Attorney, Agent, or Firm* — Holland & Hart LLP

(57) ABSTRACT

Methods, systems, and devices are described for transmissions and retransmissions of scheduling assignment (SA) information, and for content of SA transmissions. SAs may be transmitted during an initial communications period, followed by data transmissions for a certain time period. A device may monitor for transmissions during the SA period and then monitor for data transmissions during periods indicated in a received SA. SAs may be retransmitted according to a retransmission pattern that may provide time or frequency diversity patterns in order to enhance reception of SAs at a receiving device. Retransmission patterns may be determined based on a resource from an SA resource pool that is used for an initial transmission of the SA.

102 Claims, 17 Drawing Sheets

(51) Int. Cl.
*H04W 84/18* (2009.01)
*H04L 1/08* (2006.01)
*H04L 1/00* (2006.01)
*H04L 1/18* (2006.01)
*H04W 72/14* (2009.01)

(52) U.S. Cl.
CPC .............. *H04L 1/0028* (2013.01); *H04L 1/08* (2013.01); *H04L 1/1887* (2013.01); *H04L 1/1893* (2013.01); *H04W 28/021* (2013.01); *H04W 72/1289* (2013.01); *H04W 84/18* (2013.01); *H04W 72/14* (2013.01)

(56) References Cited

U.S. PATENT DOCUMENTS

| | | | |
|---|---|---|---|
| 2012/0188978 A1* | 7/2012 | Yan | H04W 72/042 370/330 |
| 2013/0114573 A1* | 5/2013 | Suzuki | H04L 1/1887 370/336 |
| 2013/0258996 A1 | 10/2013 | Jung et al. | |
| 2013/0322413 A1* | 12/2013 | Pelletier | H04W 72/1289 370/336 |
| 2014/0177461 A1* | 6/2014 | Seyedmehdi | H04B 7/026 370/252 |
| 2014/0307642 A1* | 10/2014 | Wanstedt | H04W 76/023 370/329 |
| 2015/0036613 A1* | 2/2015 | Seo | H04L 1/1822 370/329 |
| 2015/0071307 A1* | 3/2015 | De Smet | H04L 69/22 370/477 |
| 2015/0271846 A1* | 9/2015 | Kowalski | H04W 72/14 370/329 |
| 2015/0327220 A1* | 11/2015 | Pan | H04W 72/042 370/329 |
| 2016/0338103 A1* | 11/2016 | Martin | H04W 74/08 |
| 2016/0338127 A1* | 11/2016 | Matsumoto | H04W 72/0406 |
| 2016/0345375 A1* | 11/2016 | Wang | H04L 1/0041 |
| 2017/0019910 A1* | 1/2017 | Seo | H04W 76/10 |

OTHER PUBLICATIONS

Author Unknown, On scheduling procedure for D2D, 3GPP TSG-RAN WG1 Meeting #76, Doc. No. R1-140778, Feb. 14, 2014, pp. 1-5.*

Ericsson, "On Scrambling of D2D Physical Channels," 3GPP TSG RAN WG1 Meeting #76, Prague, CZ Rep., Feb. 10-14, 2014, 5 pgs., R1-140777, URL: http://www.3gpp.org/DynaReport/TDocExMtg--R1-76--30639.htm, 3rd Generation Partnership Project.

Ericsson, "On Scheduling Procedure for D2D," 3GPP TSG-RAN WG1 Meeting #76, Prague, Czech Republic, Feb. 10-14, 2014, 5 pgs., R1-140778, URL: http://www.3gpp.org/DynaReport/TDocExMtg--R1-76--30639.htm, 3rd Generation Partnership Project.

Ericsson, "D2D Scheduling Procedure," 3GPP TSG-RAN WG2 Meeting #84, San Francisco, USA, Nov. 11-15, 2013, pp. 1-7, R2-134238, URL: http://www.3gpp.org/ftp/tsg_ran/WG2_RL2/TSGR2_84/docs/, 3rd Generation Partnership Project.

Ericsson, "Overview of D2D Functions Needing Standardization," 3GPP TSG-RAN WG2 #85, Prague, CZ Rep., Feb. 10-14, 2014, pp. 1-7, R2-140797, URL: http://www.3gpp.org/ftp/tsg_ran/WG2_RL2/TSGR2_85/docs/, 3rd Generation Partnership Project.

Intel Corporation, "Discussion on Resource Allocation Methods for D2D Communication," 3GPP TSG RAN WG1 Meeting #74bis, Guangzhou, China, Oct. 7-11, 2013, pp. 1-10; R1-134139, URL: http://www.3gpp.org/DynaReport/TDocExMtg--R1-74b--30045.htm, 3rd Generation Partnership Project.

ISA/EPO, International Search Report and Written Opinion of the International Searching Authority, Int'l. App. No. PCT/US2015/013796, dated May 8, 2015, European Patent Office, Rijswijk, NL, 20 pgs.

Nokia et al., "D2D Communication Without Network Coverage", 3GPP TSG-RAN WG1 Meeting #74, Barcelona, Spain, Aug. 19-23, 2013, 6 pgs., R1-133495, URL: http://www.3gpp.org/DynaReport/TDocExMtg--R1-74--30044.htm, 3rd Generation Partnership Project.

Sony, "D2D Communication Resource Scheduling," 3GPP; TSG-RAN WG2 Meeting #85, Prague, CZ Rep., Feb. 10-14, 2014, 5 pgs., R2-140364, URL: http://www.3gpp.org/DynaReport/TDocExMtg--R2-85--30641.htm, 3rd Generation Partnership Project.

IPEA/EPO, Second Written Opinion of the International Preliminary Examining Authority, Int'l. App. No. PCT/US2015/013796, dated Feb. 8, 2016, European Patent Office, Rijswijk, NL, 11 pgs.

Taiwan Search Report—TW104103442—TIPO—dated Aug. 5, 2018.

Ericsson: "Overview of D2D Scheduling", 3GPP TSG-RAN WG21185 R2-140626, Feb. 14, 2014, 6 pages, URL:http://www.3gpp.org/ftp/tsg_ran/WG2_RL2/TSGR2_85/Docs/R2-140626.zip.

Qualcomm Incorporated: "Resource allocation for Mode 1 D2D broadcast communication", 3GPP Draft; R2-142589, 3rd Generation Partnership Project (3GPP), Mobile Competence Centre ; 650, Route Des Lucioles ; F-06921 Sophia-Antipolis Cedex; France, vol. RAN WG2, no. Seoul, South Korea; May 19, 2014-May 23, 2014, May 18, 2014 (May 18, 2014), XP050793681, 7 pages. Retrieved from the Internet: URL: http://www.3gpp.org/ftp/Meetings_3GPP_SYNC/RAN2/Docs/ [retrieved on May 18, 2014].

* cited by examiner

SCHEDULING ASSIGNMENT CONTENT AND TRANSMISSION IN WIRELESS COMMUNICATIONS

CROSS REFERENCES

The present application for patent claims priority to U.S. Provisional Patent Application No. 61/955,674 by Tavildar et al., entitled "Scheduling Assignment Content and Transmission in Wireless Communications," filed Mar. 19, 2014, assigned to the assignee hereof.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices or other user equipment (UE) devices. Base stations may communicate with UEs on downstream and upstream links. Each base station has a coverage range, which may be referred to as the coverage area of the cell. Device-to-device (D2D) communications involve direct wireless communications between UEs either within or beyond the coverage area of a base station. D2D communications may be facilitated by scheduling transmissions from a base station if the devices are within a coverage area. In some cases, D2D communications are utilized by public safety officers such as police, fire and rescue teams, etc.

In many situations, the UEs used in D2D communications are mobile devices that are battery operated. Accordingly, power savings in such devices is a significant consideration in device operation, in order to provide enhanced operational lifetime between charges of a battery. Furthermore, wireless transmissions in D2D communications may encounter interference from various sources, including wireless network base stations and other UEs that may be transmitting, for example. Thus, it would be desirable for D2D communications to provide for enhanced power savings techniques as well as to provide for enhanced interference mitigation.

SUMMARY

The described features generally relate to one or more improved systems, methods, or apparatuses for transmissions and retransmissions of scheduling assignment (SA) information, and for content of SA transmissions. According to various examples, SAs may be transmitted during an initial communications period, followed by data transmissions for a certain time period. A device may monitor for transmissions during the SA period and then monitor for data transmissions during periods indicated in a received SA. In certain examples, SAs may be retransmitted according to a retransmission pattern that may provide time or frequency diversity patterns in order to enhance reception of SAs at a receiving device. Retransmission patterns may be determined, for example, based on a resource from an SA resource pool that is used for an initial transmission of the SA. SAs may include information related to, for example, times and frequencies for data transmissions, or retransmission patterns for data transmissions. In some examples, a base station may transmit a message to a device that indicates resources that are to be used for the scheduling assignment resource pool.

In a first set of illustrative examples, a method of wireless communications may include transmitting a scheduling assignment (SA) to one or more devices, the SA indicating resources for a subsequent transmission of data to the one or more devices; and retransmitting the SA according to a predetermined retransmission pattern. The SA is transmitted, for example, in a device-to-device (D2D) broadcast transmission. In certain examples, the retransmission pattern may include a fixed frequency hopping pattern, a fixed time pattern, or a combination thereof. The fixed frequency hopping pattern may be, in examples, a fixed time pattern indicated in a system information block (SIB) or a predefined pattern.

In certain examples, the method may also include determining a first resource block within an SA resource pool for transmitting the SA; and the retransmission pattern may be based at least in part on the first resource block. In some examples, the retransmission pattern may identify one or more of: time diverse resources within the SA resource pool; or frequency diverse resources within the SA resource pool. In other examples, the SA resource pool may include a plurality of Long Term Evolution (LTE) subframes.

In some examples, the method may also include receiving a grant for transmitting the SA from a base station, and transmitting the SA may include determining a first resource block for transmitting the SA based at least in part on the grant. In some examples, the grant may include downlink control information (DCI) having an index that identifies the first resource block within the SA resource pool. Such an index may be included, for example, in a resource block assignment field of the DCI.

In certain examples, the SA may include one or more of: a modulation and coding scheme (MCS) and a redundancy version (RV) for the subsequent transmission(s) of data; a frequency hopping pattern for the subsequent transmission of data; a target identification (ID) for the subsequent transmission of data, where the subsequent transmission of data may be scrambled using the target ID; an offset for the first data transmission with respect to the transmission of the SA; a cyclic redundancy check (CRC) scrambled by the target ID; or an indicator of a last SA transmission.

In a second set of illustrative examples, an apparatus for wireless communications may include means for transmitting a scheduling assignment (SA) to one or more devices, the SA indicating resources for a subsequent transmission of data to the one or more devices; and means for retransmitting the SA according to a predetermined retransmission pattern.

In certain examples, the apparatus may implement one or more aspects of the first set of illustrative examples described above.

In a third set of illustrative examples, an apparatus for wireless communications may include a processor; memory in electronic communication with the processor; and instructions stored in the memory. The instructions may be executable by the processor to: transmit a scheduling assignment (SA) to one or more devices, the SA indicating resources for a subsequent transmission of data to the one or more devices; and retransmit the SA according to a predetermined retransmission pattern.

In certain examples, the instructions may be configured to cause the processor to implement one or more aspects of the first set of illustrative examples described above.

In a fourth set of illustrative examples, a non-transitory computer-readable medium storing instructions executable by a processor to: transmit a scheduling assignment (SA) to one or more devices, the SA indicating resources for a subsequent transmission of data to the one or more devices; and retransmit the SA according to a predetermined retransmission pattern.

In certain examples, the instructions may be configured to cause the processor to implement one or more aspects of the first set of illustrative examples described above.

In a fifth set of illustrative examples, a method of wireless communications may include receiving a message from a base station; determining a scheduling assignment (SA) resource pool based at least in part on the message; and identifying a first resource block within the SA resource pool that is to be used for transmitting an SA to one or more receivers. In certain examples, the SA may indicate resources for a subsequent transmission of data to the one or more receivers. The SA may be transmitted, for example, in a device-to-device (D2D) broadcast transmission.

In some examples, the method may also include transmitting a first SA to the one or more receivers during the first resource block, the first SA indicating resources for a subsequent transmission of data to the one or more receivers; and retransmitting the first SA according to a predetermined retransmission pattern. The retransmission pattern may include a fixed frequency hopping pattern, a fixed time pattern, or a combination thereof, which may be indicated in a system information block (SIB) or may be a predefined pattern, for example. In some examples, the retransmission pattern may identify one or more of time diverse resources within the SA resource pool; or frequency diverse resources within the SA resource pool. The SA resource pool may include a plurality of Long Term Evolution (LTE) subframes. In some examples, the message may include downlink control information (DCI) having an index that identifies the first resource block in the SA resource pool. The index may be included in a resource block assignment field of the DCI, for example.

In certain examples, the SA may include one or more of a modulation and coding scheme (MCS) and a redundancy version (RV) for the subsequent transmission of data; a frequency hopping pattern for the subsequent transmission of data; a target identification (ID) for the subsequent transmission of data, where the subsequent transmission of data is scrambled using the target ID; or an offset for the first data transmission with respect to the transmission of the SA.

In a sixth set of illustrative examples, an apparatus for wireless communications may include means for receiving a message from a base station; means for determining a scheduling assignment (SA) resource pool based at least in part on the message; and means for identifying a first resource block within the SA resource pool that is to be used for transmitting an SA to one or more receivers.

In certain examples, the apparatus may implement one or more aspects of the fifth set of illustrative examples described above.

In a seventh set of illustrative examples, an apparatus for wireless communications may include a processor; memory in electronic communication with the processor; and instructions stored in the memory. The instructions may be executable by the processor to receive a message from a base station; determine a scheduling assignment (SA) resource pool based at least in part on the message; and identify a first resource block within the SA resource pool that is to be used for transmitting an SA to one or more receivers.

In certain examples, the instructions may be configured to cause the processor to implement one or more aspects of the fifth set of illustrative examples described above.

In an eighth set of illustrative examples, a non-transitory computer-readable medium storing instructions executable by a processor to receive a message from a base station; determine a scheduling assignment (SA) resource pool based at least in part on the message; and identify a first resource block within the SA resource pool that is to be used for transmitting an SA to one or more receivers.

In certain examples, the instructions may be configured to cause the processor to implement one or more aspects of the fifth set of illustrative examples described above.

In a ninth set of illustrative examples, a method of wireless communications may include receiving a scheduling assignment (SA) transmission, the SA indicating resources for receiving a subsequent transmission of data; and receiving at least one retransmission of the SA according to a predetermined retransmission pattern. In some examples, the method may also include combining the SA transmission and retransmission(s) to determine the SA. The SA is transmitted, for example, in a device-to-device (D2D) broadcast transmission.

In certain examples, the predetermined retransmission pattern may include a fixed frequency hopping pattern, a fixed time pattern, or a combination thereof. The fixed frequency hopping pattern, fixed time pattern, or combination thereof may be indicated, for example, in a system information block (SIB) received from a transmitting device, or may be a predefined pattern.

In some examples, the method may also include determining a first resource block where the SA transmission is received; and the retransmission pattern may be based at least in part on the first resource block. The SA may include one or more of: a modulation and coding scheme (MCS) and a redundancy version (RV) for the subsequent transmission of data; a frequency hopping pattern for the subsequent transmission of data; a target identification (ID) for the subsequent transmission of data, and the subsequent transmission of data may be scrambled using the target ID; a cyclic redundancy check (CRC) scrambled by the a target ID; or an offset for the first data transmission with respect to the SA resource pool or the transmission of the SA.

In a tenth set of illustrative examples, an apparatus for wireless communications may include means for receiving a scheduling assignment (SA) transmission, the SA indicating resources for receiving a subsequent transmission of data; and means for receiving at least one retransmission of the SA according to a predetermined retransmission pattern.

In certain examples, the apparatus may implement one or more aspects of the ninth set of illustrative examples described above.

In an eleventh set of illustrative examples, an apparatus for wireless communications may include a processor; memory in electronic communication with the processor; and instructions stored in the memory. The instructions may be executable by the processor to: receive a scheduling assignment (SA) transmission, the SA indicating resources for receiving a subsequent transmission of data; and receive at least one retransmission of the SA according to a predetermined retransmission pattern.

In certain examples, the instructions may be configured to cause the processor to implement one or more aspects of the ninth set of illustrative examples described above.

In a twelfth set of illustrative examples, a non-transitory computer-readable medium storing instructions executable by a processor to: receive a scheduling assignment (SA) transmission, the SA indicating resources for receiving a subsequent transmission of data; and receive at least one retransmission of the SA according to a predetermined retransmission pattern.

In certain examples, the instructions may be configured to cause the processor to implement one or more aspects of the ninth set of illustrative examples described above.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
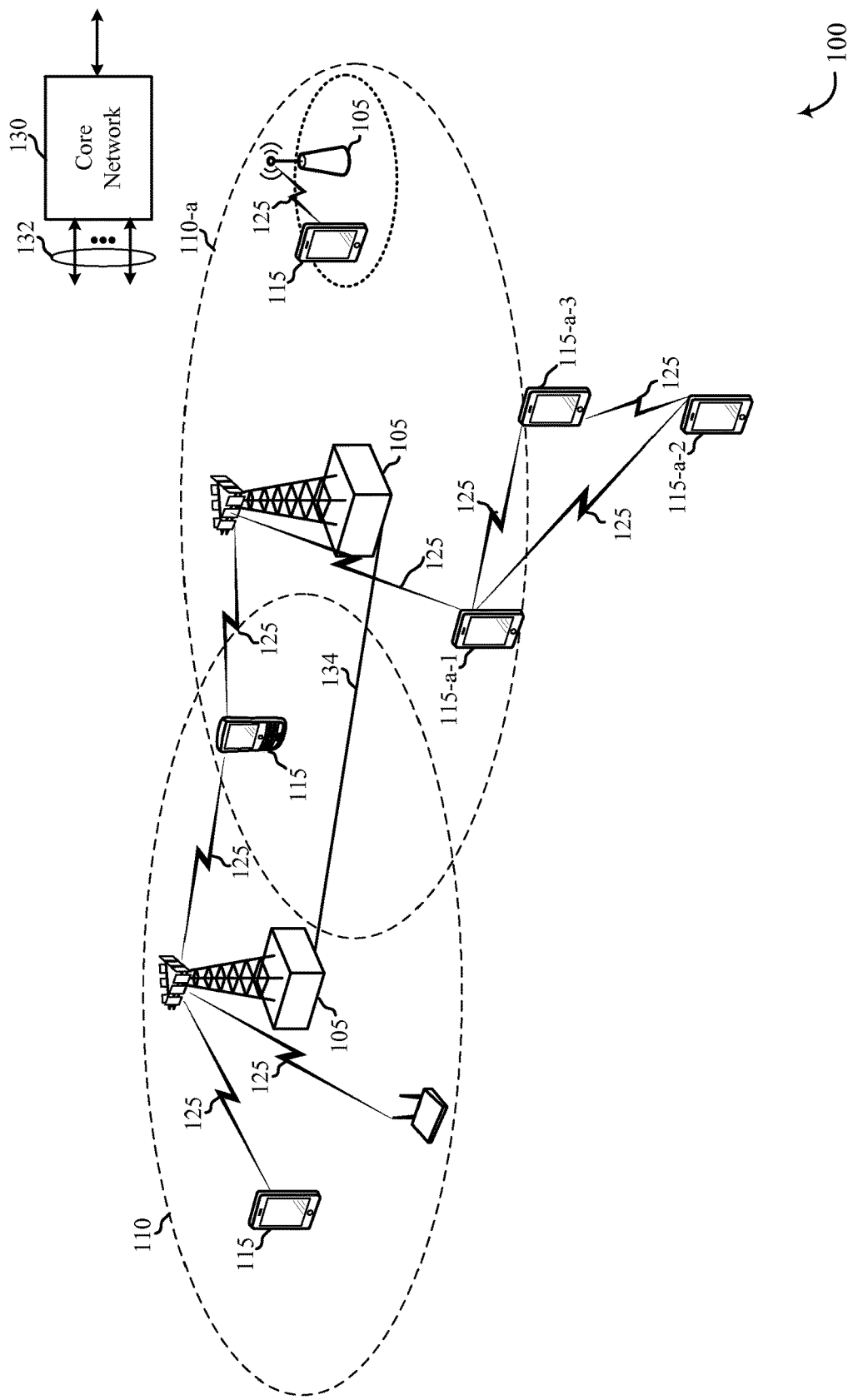
FIG. 1 illustrates an example of a wireless communications system in accordance with various aspects of the present disclosure.

Features generally relating to one or more improved systems, methods, or apparatuses for transmissions and retransmissions of scheduling assignments (SAs) are described. To provide power savings in D2D communications, user equipments (UEs) may be provided with an SA that indicates resources that may be used to transmit data to the UE. SA information may be transmitted during a predetermined period followed by data transmissions for a predetermined period, allowing a UE to monitor transmissions during the SA period and monitor transmissions for portions of the data transmission period indicated for the UE by an SA.

In certain examples, the SA may be transmitted using an initial resource from an SA resource pool, and retransmitted using one or more other SA resources from the SA resource pool. The SA may indicate, for example, resources for a subsequent transmission of data, and may be retransmitted one or more times according to a predetermined retransmission pattern, which may include a fixed frequency hopping pattern or a fixed time pattern. The retransmission pattern may be indicated in a system information block (SIB) or may be predefined according to a wireless communications standard, for example. In some examples, a base station may transmit a message to a device that indicates resources that are to be used for the SA resource pool.

A retransmission pattern for SA retransmissions may be determined based on a resource block within the SA resource pool used for transmitting the SA. A receiver may determine the resource block, and then determine the SA retransmission pattern, where different resource blocks for the first transmission may indicate different numbers of retransmissions, timing for retransmissions, or frequency hopping for retransmissions. Such retransmissions may provide for enhanced reception of SAs through combining of the original SA transmission and the one or more retransmissions. Furthermore, devices may simply monitor the SA resource pool, and may power off receiver components during data transmission periods when the device is not scheduled according to the SA. The SA may include information related to timing, scrambling, transmission schemes, or frequency hopping for subsequent data transmissions, for example.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples. The following description uses the terms DTX and discontinuous transmission interchangeably.

FIG. 1 illustrates an example of a wireless communications system 100 in accordance with various aspects of the present disclosure. The wireless communications system 100 includes base stations 105, communication devices, also known as a user equipment (UE) 115, and a core network 130. The base stations 105 may communicate with the UEs 115 under the control of a base station controller (not shown), which may be part of the core network 130 or the base stations 105 in various examples. Base stations 105 may communicate control information or user data with the core network 130 through backhaul links. In examples, the base stations 105 may communicate, either directly or indirectly, with each other over backhaul links 134, which may be wired or wireless communication links. The wireless communications system 100 may support operation on multiple carriers (waveform signals of different frequencies). Wireless communication links 125 may be modulated according to various radio technologies. Each modulated signal may carry control information (e.g., reference signals, control channels, etc.), overhead information, data, etc. Wireless communication links 125 may also be established between UEs 115 in a configuration known as D2D communication.

The base stations 105 may wirelessly communicate with the UEs 115 via one or more base station antennas. Each of the base station 105 sites may provide communication coverage for a respective geographic area (e.g., coverage area) 110. In some examples, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up a portion of the coverage area. The wireless communications system 100 may include base stations 105 of different types (e.g., macro, micro, or pico base stations). There may be overlapping coverage areas for different technologies.

The wireless communications system 100 may be a Heterogeneous LTE/LTE-A network in which different types of base stations provide coverage for various geographical regions. For example, each base station 105 may provide communication coverage for a macro cell, a pico cell, a femto cell, or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell.

The core network 130 may communicate with the base stations 105 via a backhaul link 132 (e.g., S1, etc.). The base stations 105 may also communicate with one another (e.g., directly or indirectly) via backhaul links 134 (e.g., X2, etc.) or via backhaul links 132 (e.g., through core network 130). The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The UEs 115 are dispersed throughout the wireless communications system 100, and each UE may be stationary or mobile. A UE 115 may communicate with other UEs 115 using D2D communications. One or more of a group of UEs (for example, a first UE 115-*a*-1) utilizing D2D communications may be within a coverage area 110-*a* of a cell. Other UEs (for example a second UE 115-*a*-2 and a third UE 115-*a*-3) in such a group may be outside the coverage area 110-*a* of the cell, or otherwise unable to receive transmissions from a base station 105. Groups of UEs 115-*a* communicating via D2D communications may utilize a one-to-many (1:M) system in which each UE 115-*a* transmits to every other UE 115-*a* in the group. In some cases, a base station 105 facilitates the scheduling of resources for D2D communications. In other cases, D2D communications are carried out independent of a base station 105. In some cases, UEs 115-*a* engaged in D2D communications may be located relatively closely. In other circumstances, the UEs 115-*a* may communicate with each other over long distances. As mentioned above, in some examples a transmitting UE may transmit an SA that indicates when data will be transmitted and may indicate other characteristics of the data communication (e.g., MCS/RV, frequency hopping pattern, etc.). A SA may be retransmitted one or more times according to an SA retransmission pattern, which may allow for enhanced reception of SAs. Furthermore, a receiving UE 115 may not monitor communications for an entire data transmission period, thus reducing power consumption.

A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with macro eNBs, pico eNBs, femto eNBs, relays, and the like.

The wireless communication links 125 shown in wireless communication system 100 may include uplink (UL) transmissions from a UE 115 to a base station 105, or downlink (DL) transmissions from a base station 105 to a UE 115 over DL carriers. They may also represent D2D communication links. The downlink transmissions may also be called forward link transmissions while the uplink transmissions may also be called reverse link transmissions.

Figure 2:
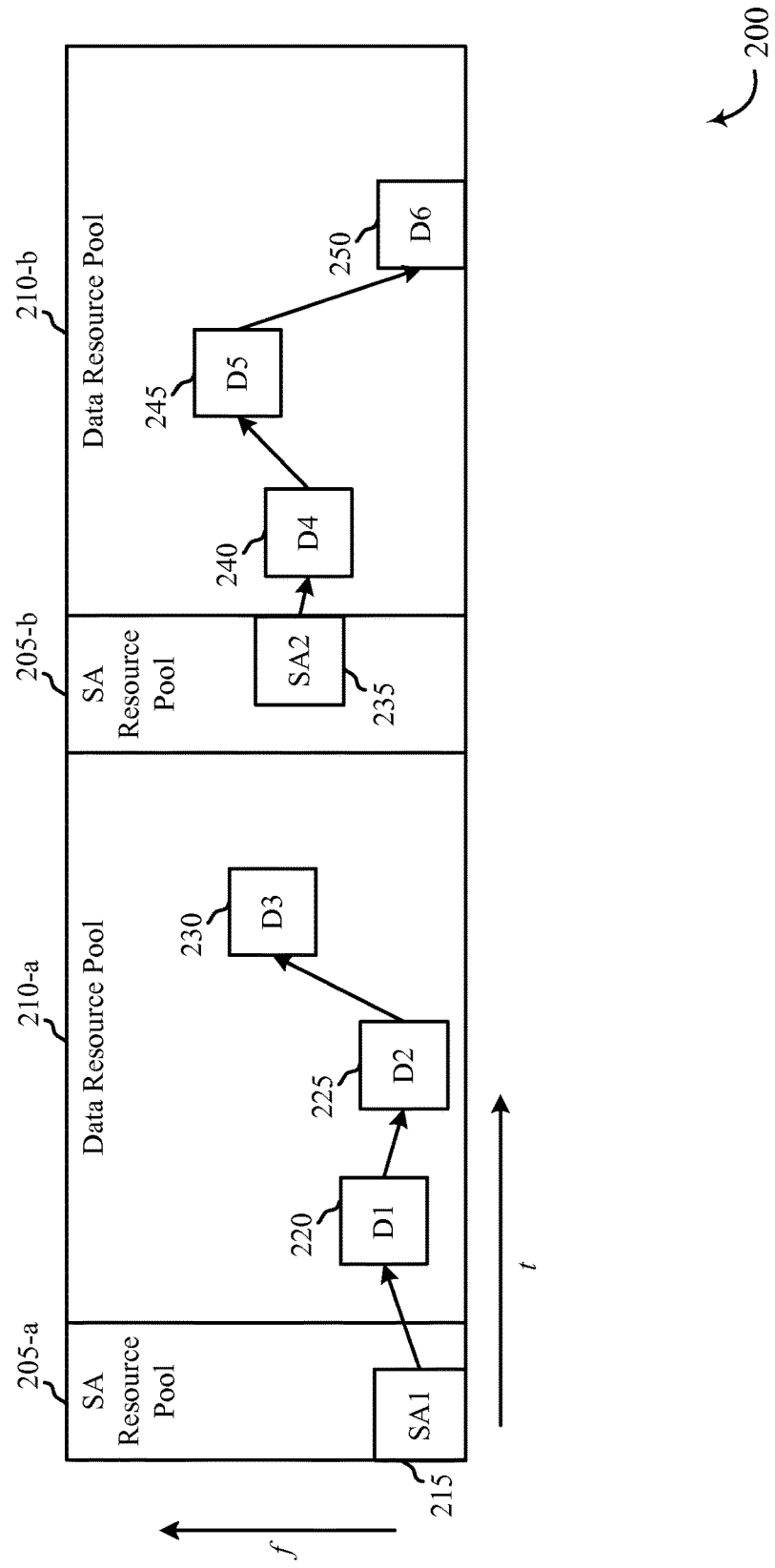
FIG. 2 illustrates an example of SA and data resource pools for transmissions of SAs and data in accordance with various aspects of the present disclosure.

FIG. 2 illustrates an example 200 of SA resource pools and data resource pools for transmissions of SAs and data, in accordance with various aspects of the present disclosure. Specifically, FIG. 2 illustrates a first SA resource pool 205-a and a first data resource pool 210-a, and a second SA resource pool 205-b and a second data resource pool 210-b. The resource pools 205 and 210 may be used to transmit SAs and data between UEs, such as UEs 115 in FIG. 1, in D2D communications, for example. In some examples, a transmitting UE may transmit a first SA to one or more receiving UEs using resources SA1 215 from within SA resource pool 205-a. The first SA may indicate resources (e.g., different time or frequency resources) for subsequent transmissions of data to the one or more receiving UEs or devices. In the example of FIG. 2, the first SA may indicate resources D1 220, D2 225, and D3 230 from within data resource pool 210-a that may be used to transmit data to a receiving UE. The content of the first SA may indicate one or more items of information related to data transmissions, as will be described in more detail below. According to certain examples, the first SA may be retransmitted one or more times using other resources within resources SA1 215. The retransmissions of the first SA may be performed according to a predetermined retransmission pattern, such as retransmissions at certain times or frequencies.

Following the data resource pool 210-a, in this example, is a second SA resource pool 205-b, that may be used to transmit a second SA using resources SA2 235. Similarly as with the first SA, the second SA may be retransmitted one or more times using other resources of SA2 235, and may indicate resources D4 240, D5 245, and D6 250 from within data resource pool 210-b that may be used to transmit data to a receiving UE. The D2D transmissions from a transmitting UE may be transmitted as broadcast transmissions to one or more receiving UEs. According to some examples, a receiving UE may monitor the SA resource pool 205-a and receive the first SA. If the first SA indicates that the receiving UE is to receive data in a subsequent data transmission, the receiving UE may monitor the data resource pool 210-a during time(s) indicated by the first SA, and may thus save power by monitoring data pool resources D1 220, D2 225, and D3 230. Similarly, if a receiving UE determines that the first SA, or any other SA transmitted in the SA resource pool 205-a, does not indicate that the receiving UE is scheduled to receive data in data resource pool 210-a, the receiving UE may discontinue monitoring D2D transmissions until the second SA resource pool 205-b.

Figure 3A:
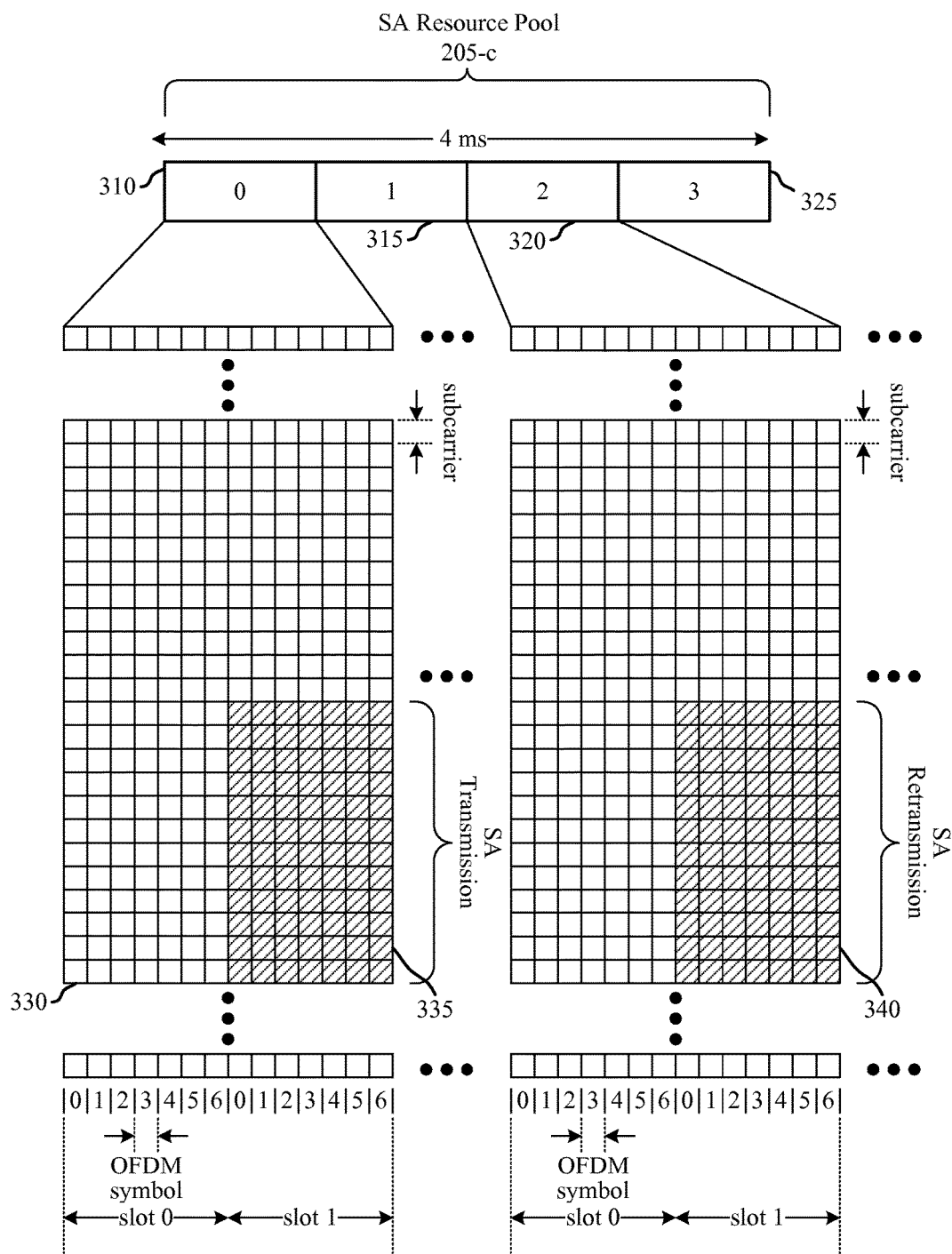
FIG. 3A illustrates an example of SA resource pool resources for SA transmissions in accordance with various aspects of the present disclosure.

As mentioned above, an SA may be retransmitted one or more times within an SA resource pool. With reference now to FIG. 3A, an example of a frame structure 300 for SA retransmissions within an SA resource pool 205-c is described. SA resource pool 205-c may be utilized, for example, in D2D communications between UEs, such as UEs 115 in FIG. 1. In this example, SA resource pool 205-c is a 4 ms resource pool that includes four subframes 310, 315, 320, and 325. In some examples, the 4 ms SA resource pool 205-c may be followed by a 160 ms data resource pool (e.g., data resource pool 210 in FIG. 2).

According to certain examples, each subframe 310-325 may include two consecutive time slots, slot 0 and slot 1, and may be illustrated as a resource grid representing two time slots. The resource grid may be divided into multiple resource elements 330. In LTE, a resource block 335 may contain 12 consecutive subcarriers in the frequency domain and, for a normal cyclic prefix in each OFDM symbol, 7 consecutive OFDM symbols in the time domain, or 84 resource elements 330. Some of the resource elements 330 may include one or more reference signals. The number of bits carried by each resource element 330 may depend on the modulation scheme. Thus, the more resource blocks that a UE receives and the higher the modulation scheme, the higher the data rate may be for the UE. A downlink control channel, such as a physical downlink control channel (PDCCH) may be time-division multiplexed with a physical downlink shared channel (PDSCH).

In the example of FIG. 3A, resource block 335 in subframe 310 may be used to transmit an SA transmission. The SA may then be retransmitted using resource block 340 of subframe 320, in some examples. SA retransmission may provide transmission diversity to transmit multiple versions of the same data over multiple channels. Each of the channels may be defined according to one or more partitions in a time domain (e.g., time slots), frequency domain (e.g., subcarriers), coding domain (e.g., CDMA coding), or antenna/direction (e.g., different antenna ports). Thus, using the example frame structure 300 of FIG. 3A, transmission diversity may be achieved by transmitting the different versions of the SA using different resource elements. In other examples, transmission diversity may also be achieved by transmitting the different versions of the data using the same resource elements and different coding, antennas, or direction. Thus, a receiving UE that receives interference corresponding to certain resource elements in a subframe may monitor other resources for retransmissions of the SA, and may combine two or more of the received versions of the SA to estimate and cancel the interference.

Figure 3B:
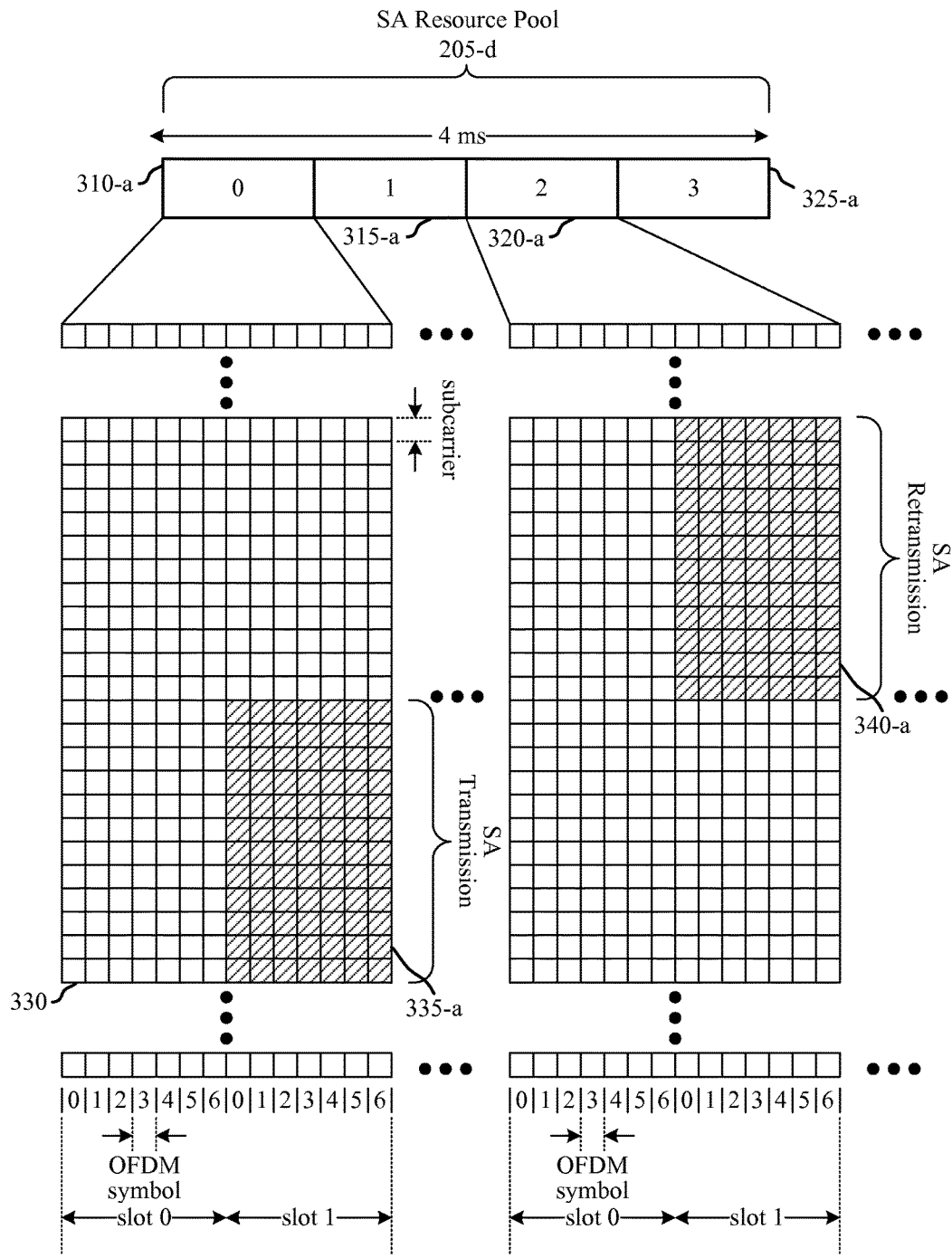
FIG. 3B illustrates another example of SA resource pool resources for SA transmissions in accordance with various aspects of the present disclosure.

According to various examples, the retransmission pattern for retransmitting SAs may include a number of retransmissions, and particular resources that are used for the retransmissions. For example, the retransmission pattern may be a fixed frequency hopping pattern, a fixed time pattern, or a combination thereof. FIG. 3B illustrates another example of a frame structure 300-*a* for SA retransmissions within an SA resource pool 205-*d*. SA resource pool 205-*d*, similarly as described with respect to FIG. 3A, may be utilized in D2D communications between UEs, such as UEs 115 in FIG. 1. In this example, SA resource pool 205-*d* is a 4 ms resource pool that includes four subframes 310-*a*, 315-*a*, 320-*a*, and 325-*a*. In this example, a first resource block 335-*a* of subframe 310-*a* may be used for an SA transmission and a second resource block 340-*a* of subframe 320-*a* may be used for an SA retransmission. In this example, second resource block 340-*a* uses different frequency resources and different time resources than the first resource block 335-*a*.

The particular retransmission pattern for the one or more SA retransmissions may be determined, for example, by a fixed frequency hopping pattern, fixed time pattern, or combination thereof, that is indicated in a system information block (SIB). In other examples, the retransmission pattern may be a predefined pattern that is established by a specification or wireless communications standard. In some examples, a number of different retransmission patterns may be available, and a particular retransmission pattern may be determined based on the first resource block 335 within the SA resource pool 205. The retransmission pattern may identify, for example, time diverse resources within the SA resource pool 205 or frequency diverse resources within the SA resource pool 205.

A transmitting UE, such as a UE 115 of FIG. 1, may, in some examples, receive a message for transmitting the SA from a base station or eNB, such as an eNB 105 of FIG. 1. The message may include, for example, a resource grant from the base station indicating resources for use in D2D communications. Based on the grant, the transmitting UE may determine an SA resource pool and a data resource pool which may be, for example, 4 ms and 160 ms resource pools, respectively. The transmitting UE may then determine the first resource block for transmitting the SA based, at least in part, on the grant. In some examples, the message received by the transmitting UE may include downlink control information (DCI) comprising an index that identifies the first resource block. The index may be included, for example, in a resource block assignment field of the DCI, where resource block assignments may be mapped to resource blocks for use in transmitting SAs. As noted above, resources for SA retransmissions may then be determined based on the resource block for the initial SA transmission.

The SA may include, as mentioned above, information related to one or more subsequent transmissions of data in the data resource pool, such as data resource pools 210 of FIG. 2, for example. The SA may include, for example, a modulation and coding scheme (MCS) and a redundancy version (RV) for the subsequent transmission of data. Furthermore, the SA may include a frequency hopping pattern for subsequent transmissions of data, in which a first data transmission may use first frequency resources, and a second data transmission may use diverse frequency resources from the first data transmission. The SA may, additionally or alternatively, include a time hopping pattern that indicated time resources that may be used for one or more data transmissions. In some examples, the SA may include a time offset that indicates a time for the first data transmission with respect to the transmission of the SA. In some deployments, a data transmission may have a fixed offset (e.g., 4 ms) from the SA, and the time offset may establish a time for the data transmission that is in excess of the base 4 ms offset, for example. In other examples, the SA may include a target identification (ID) for the subsequent transmission of data, the subsequent transmission of data may be scrambled using the target ID. Such scrambling may provide interference mitigation for transmitted data, for example. In some examples, the SA transmission may include a cyclic redundancy check (CRC) scrambled by the target ID.

Figure 4A:
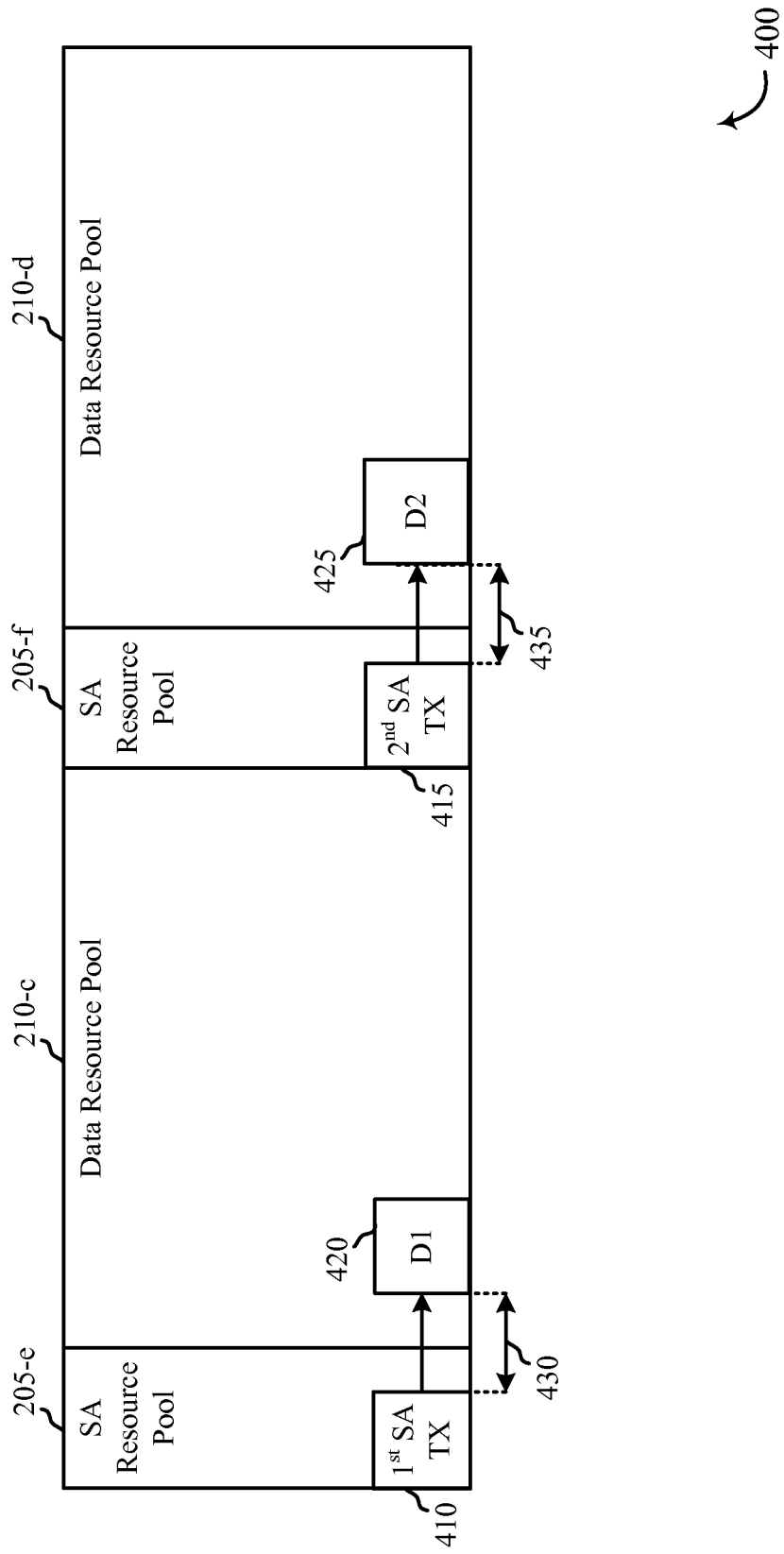
FIG. 4A illustrates an example of a data transmission following an SA in accordance with various aspects of the present disclosure.

As mentioned above, an SA may include information indicating details for one or more data transmissions in a data resource pool. With reference now to FIG. 4A, example 400 of SA resource pools and data resource pools for transmissions of SAs and data, in accordance with various aspects of the present disclosure, is described. In this example, a first SA resource pool 205-*e* is followed by a first data resource pool 210-*c*, and a second SA resource pool 205-*f* is followed by a second data resource pool 210-*d*. SA resource pools 205 and data resource pools 210 may be examples of the SA or data resource pools of FIG. 2, 3A, or 3B, and may be utilized, for example, in D2D communications between UEs, such as UEs 115 in FIG. 1. In this example, SA resource pools 205-*e* and 205-*f* are a 4 ms resource pools each followed by 160 ms data resource pools 210-*c* and 210-*d*, respectively.

In the example of FIG. 4A, a first SA is transmitted using first SA resources 410. The first SA resources 410 may include resources for the first SA transmission as well as one or more SA retransmissions, such as discussed above, and may include information related to a first data transmission 420. The first SA may include, for example, information related to a time offset 430, and the first data transmission 420 may be transmitted following the time offset 430. Similarly, a second SA may be transmitted using second SA resources 415. The second SA resources 415, as with the first SA resources 410, may include resources for the second SA transmission as well as one or more SA retransmissions, such as discussed above, and may include information related to a second data transmission 425. The second SA may include, for example, information related to a second time offset 435, and the second data transmission 425 may be transmitted following the second time offset 435. The time offsets 430 and 435 may be the same time offset, or may be different time offsets. In some examples, as mentioned above, a particular time offset 430, 435 may be mapped to a particular resource in the SA resource pool 205 that is used for the first transmission of an SA. In some deployments, data transmissions 420, 425 may have a fixed offset (e.g., 4 ms) from the first resource block of the respective SA resources 410, 415, and the respective time offsets 430, 435 may be establish as offsets in excess of the base 4 ms offset. In addition to, or alternatively to, a time offset such as time offsets 430, 435, an SA may include, in some examples, a modulation and coding scheme (MCS) or a redundancy version (RV) for the subsequent transmission of data. In other examples, an SA may include a field or indicator that indicates the last SA transmission of the transmitter, which a receiving device may use to determine when to power off receiving components, which may then be powered back on based on when a data transmission is expected, or for a subsequent SA transmission period (e.g., a subsequent 4 ms SA resource pool).

Figure 4B:
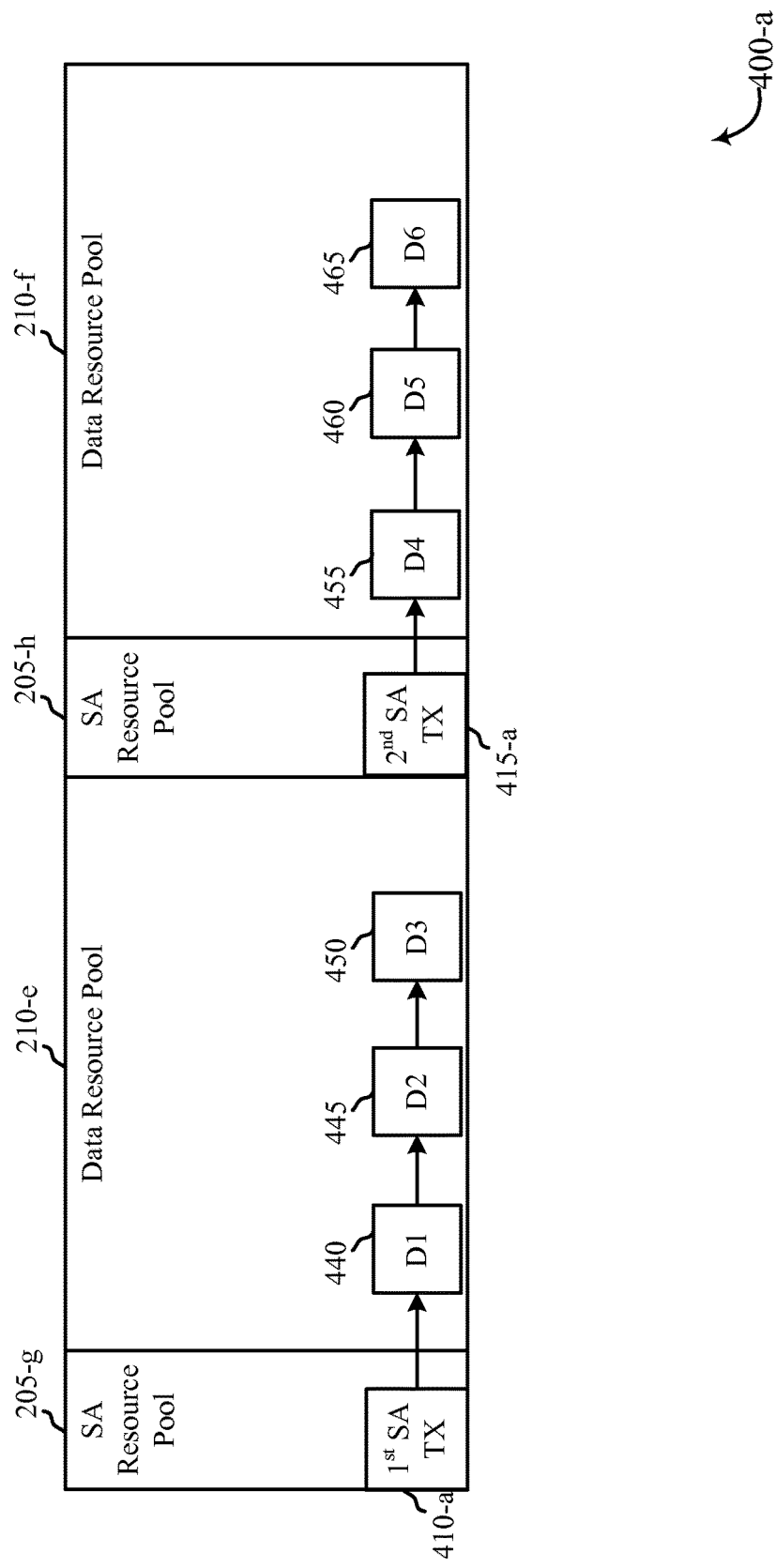
FIG. 4B illustrates an example of multiple data transmissions following an SA in accordance with various aspects of the present disclosure.

In some examples, an SA may include a timing offset pattern for subsequent data transmissions. FIG. 4B illustrates an example 400-*a* of timing patterns for data transmissions in data resource pools, in accordance with various aspects of the present disclosure. In this example, SA resource pool 205-*g* is followed by a data resource pool 210-*e*, and a second SA resource pool 205-*h* is followed by a second data resource pool 210-*f* SA resource pools 205 and data resource pools 210 may be examples of the SA or data resource pools of FIG. 2, 3A, or 3B, and may be utilized, for example, in D2D communications between UEs, such as UEs 115 in FIG. 1. In this example, three data transmissions 440, 445, 450 are transmitted in data resource pool 210-*e* following an SA transmission 410-*a*. Similarly, a second set of three data transmissions 455, 460, 465 are transmitted in data resource pool 210-*f* following second SA transmission 415-*a*. The data transmissions 440-465 may be transmitted, according to various examples, according to a timing pattern that is indicated in the respective SA transmission 410-*a* or 415-*a*. In some examples, the SA may include a timing offset and an indication of a number of data transmissions. For example, the SA may include the offset for the first data transmission with respect to the SA transmission, which in one example is determined as SA [(n+4)+m*X−SA], where n is the time of the resource used for the initial SA transmission, m is the offset size, and X is the number of offsets.

In some examples, the SA may also include downlink control information. For example, the contents of a DCI from the eNB may simply be transmitted as is in the SA. In other examples, SAs may be sent at a fixed MCS and retransmission scheme, but contain within them a different MCS/RV for subsequent data transmissions. SAs also may contain, in certain examples, a target ID. Such a target ID may be compressed in some examples, such as when a target ID exceeds a certain size. The target ID sent in the SA may be used for scrambling the subsequent data transmissions. Such scrambling may provide interference mitigation for transmitted data, for example. The receiving UE, once the SA is received, may then determine resources from the data resource pool 210-*e* and 210-*f* that are to be monitored for reception of the data transmissions. In some examples, a single data transmission may be repeated a number of times using different resources to enhance the likelihood of proper reception of the data transmissions 440-465.

Figure 4C:
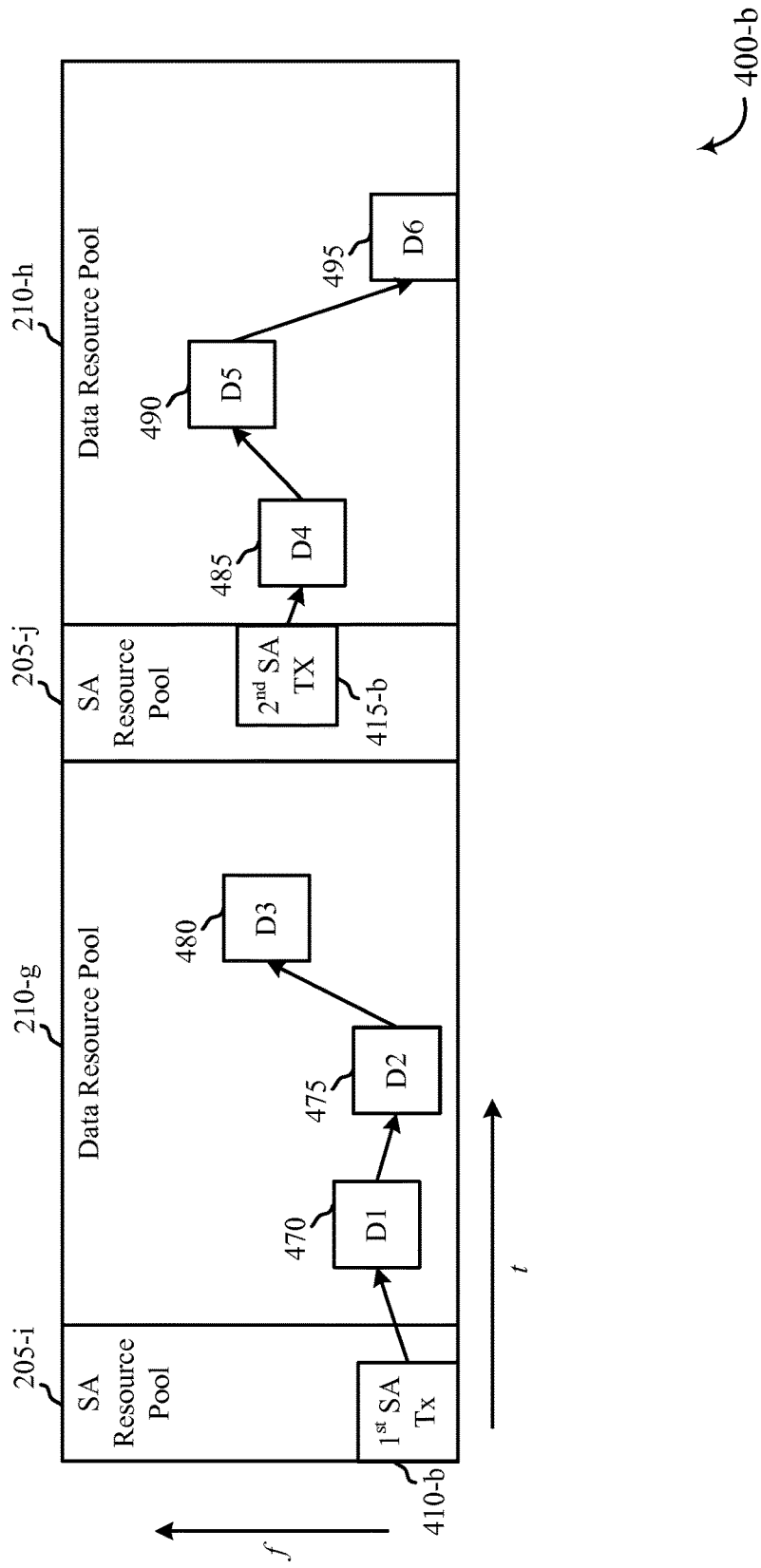
FIG. 4C illustrates an example of data transmissions having time and frequency diversity following an SA in accordance with various aspects of the present disclosure.

Furthermore, according to certain examples, the SA may include a frequency hopping pattern for subsequent transmissions of data, in which a first data transmission may use first frequency resources, and a second data transmission may use diverse frequency resources from the first data transmission. FIG. 4C illustrates an example 400-*b* of frequency hopping patterns for data transmissions in data resource pools, in accordance with various aspects of the present disclosure. In this example, SA resource pool 205-*i* is followed by a data resource pool 210-*g*, and a second SA resource pool 205-*j* is followed by a second data resource pool 210-*h*. SA resource pools 205 and data resource pools 210 may be examples of the SA or data resource pools of FIG. 2, 3A, or 3B, and may be utilized, for example, in D2D communications between UEs, such as UEs 115 in FIG. 1. In this example, three data transmissions 470, 475, 480 are transmitted in data resource pool 210-*g* following an SA transmission 410-*b*. Similarly, a second set of three data transmissions 485, 490, 495 are transmitted in data resource pool 210-*h* following second SA transmission 415-*b*. The data transmissions 440-465 may be transmitted, according to various examples, according to a frequency hopping and timing pattern that is indicated in the respective SA transmission 410-*b* or 415-*b*.

In some examples, the SA may include frequency hopping pattern, a timing offset, and an indication of a number of data transmissions. In certain examples, for data transmissions 470, 475, and 480 the frequency hopping pattern, timing pattern, or number of data transmissions may be determined based on the resource in the SA resource pool 205-*i* used to transmit the first SA transmission 410-*b*. Likewise, data transmissions 485, 490, and 495 may have timing, frequency hopping, and a number of transmissions based on the resource in the SA resource pool 205-*j* used to transmit the second SA transmission 415-*b*. The receiving UE may then determine resources from the data resource pool 210-*e* and 210-*f* that are to be monitored for reception of the data transmissions. In other examples, the SA may include a target identification (ID) for the subsequent transmission of data, the subsequent transmission of data may be scrambled using the target ID. Such scrambling may provide interference mitigation for transmitted data, for example.

Figure 5:
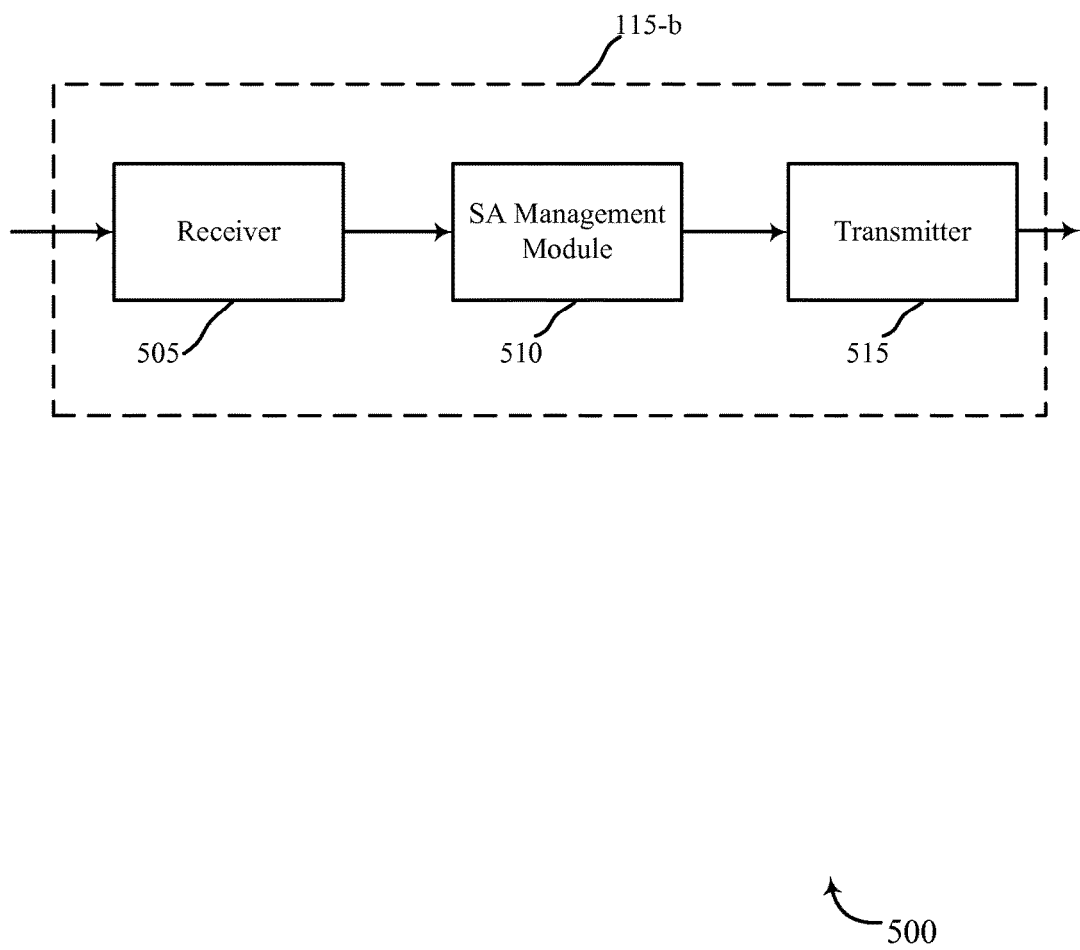
FIG. 5 shows a block diagram of a device that implements SAs in D2D communications in accordance with various aspects of the present disclosure.

FIG. 5 shows a block diagram 500 of a UE 115-*b* for transmitting or receiving SA and data transmissions in accordance with various aspects of the present disclosure. The UE 115-*b* may be an example of one or more aspects of a UE 115 described with reference to FIG. 1. The UE 115-*b* may include a receiver 505, an SA management module 510, or a transmitter 515. The UE 115-*b* may also include a processor. Each of these components may be in communication with each other.

The components of the UE 115-*b* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver 505 may receive information such as packets, user data, or control information associated with various information channels (e.g., control channels, data channels, etc.). For example, the receiver 505 may receive a message from a base station indicating one or more resources to be used for SA or data transmissions. The message from the base station may be received, for example, in a SIB or in DCI, for example. Information may be passed on to the SA management module 510, and to other components of the UE 115-*b*.

The SA management module 510 may determine scheduling assignments one or more data transmissions. If UE 115-*b* is a D2D transmitting device, for example, the SA(s) may be determined for receiving UEs, and resources from an SA resource pool may be determined for transmission of the SA(s). Furthermore, SA management module 510 may determine a retransmission pattern for retransmissions of the SA(s), which may include one or both of a timing pattern and frequency hopping pattern for SA retransmissions, similarly as discussed above. If UE 115-*b* is a D2D receiving device, the SA management module 510 may monitor SA resources and determine if an SA transmission or retransmission are received. Based on the resources from the SA resource pool used for the SA transmissions(s), the SA management module 510 may determine an SA retransmission pattern and resources that are to be used for data transmissions, which may include one or both of a timing pattern and frequency hopping pattern, similarly as discussed above.

The transmitter 515 may transmit the one or more signals received from other components of the UE 115-*b*. For example, the transmitter 515 may transmit SA and data transmissions to one or more receiving UEs in D2D transmissions. In some examples, the transmitter 515 may be collocated with the receiver 505 in a transceiver module. The transmitter 515 may include a single antenna, or it may include a plurality of antennas.

Figure 6:
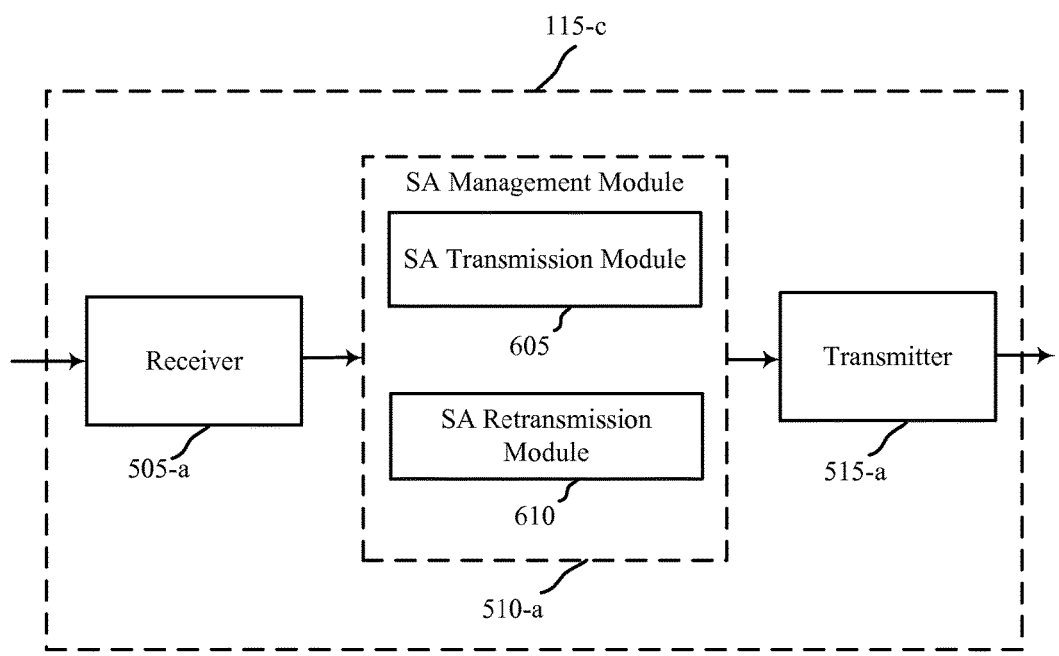
FIG. 6 shows a block diagram of a device for SA transmissions and retransmissions in accordance with various aspects of the present disclosure.

FIG. 6 shows a block diagram 600 of a UE 115-c for transmitting or receiving SA and data transmissions in accordance with various aspects of the present disclosure. The UE 115-c may be an example of one or more aspects of a UE 115 described with reference to FIG. 1 or 5. The UE 115-c may include a receiver 505-a, an SA management module 510-a, or a transmitter 515-a. The UE 115-c may also include a processor. Each of these components may be in communication with each other. The SA management module 510-a may also include an SA transmission module 605 and an SA retransmission module 610.

The components of the UE 115-c may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver 505-a may receive information which may be passed on to the SA management module 510-a, and to other components of the UE 115-c as described above with reference to FIG. 5. The SA management module 510-a may be configured to perform the operations described above with reference to FIG. 5. The transmitter 515-a may transmit the one or more signals received from other components of the UE 115-c. For example, in cases where UE 115-c is a D2D transmitting device, it may transmit SA and data transmissions using D2D communications to one or more receiving UEs.

The SA transmission module 605 may be configured to determine SAs and resources from an SA resource pool for use in SA transmissions, in a similar manner as discussed above with respect to FIG. 2, 3A, 3B, 4A, 4B, or 4C. The SA retransmission module 610 may be configured to determine SA retransmission patterns, in a similar manner as discussed above with respect to FIG. 2, 3A, 3B, 4A, 4B, or 4C.

Figure 7:
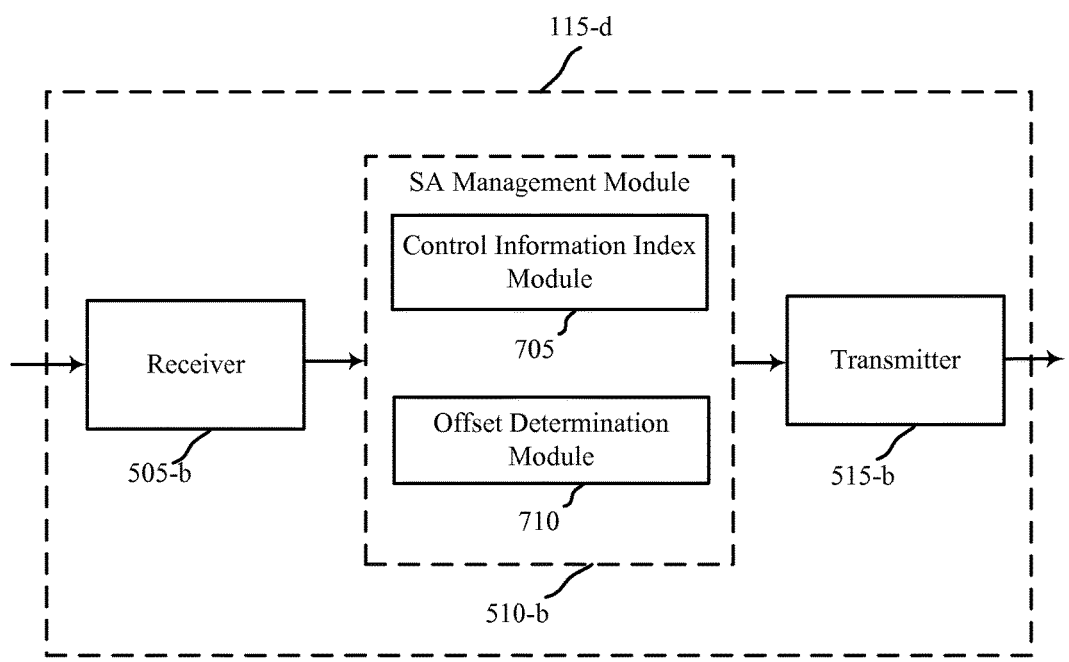
FIG. 7 shows a block diagram of a device for SA transmissions and content determination for SA transmissions in accordance with various aspects of the present disclosure.

FIG. 7 shows a block diagram 700 of a UE 115-d for transmitting or receiving SA and data transmissions in accordance with various aspects of the present disclosure. The UE 115-d may be an example of one or more aspects of a UE 115 described with reference to FIG. 1, 5 or 6. The UE 115-d may include a receiver 505-b, an SA management module 510-b, or a transmitter 515-b. The UE 115-d may also include a processor. Each of these components may be in communication with each other. The SA management module 510-b may also include a control information index module 705 and an offset determination module 710.

The components of the UE 115-d may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver 505-b, in this example, may receive information from a base station that indicates an SA resource pool which may be passed on to the SA management module 510-b, and to other components of the UE 115-d. The SA management module 510-b also may be configured to perform the operations described above with reference to FIG. 5 or 6. The transmitter 515-b may transmit the one or more signals received from other components of the UE 115-d. For example, in cases where UE 115-d is a D2D transmitting device, it may transmit SA and data transmissions using D2D communications to one or more receiving UEs.

The control information index module 705 may be configured to receive a message from a base station that indicates an SA resource pool for use in SA transmissions and retransmissions, in a similar manner as discussed above with respect to FIG. 2, 3A, 3B, 4A, 4B, or 4C. The message may be received, for example, in DCI received by the UE 115-d. In other examples, the message may be received in a SIB by UE 115-d. The offset determination module 710 may be configured to determine timing offsets for the transmission of SA and data transmissions in D2D communications, such as described with respect to FIG. 2, 3A, 3B, 4A, 4B, or 4C, for example.

Figure 8:
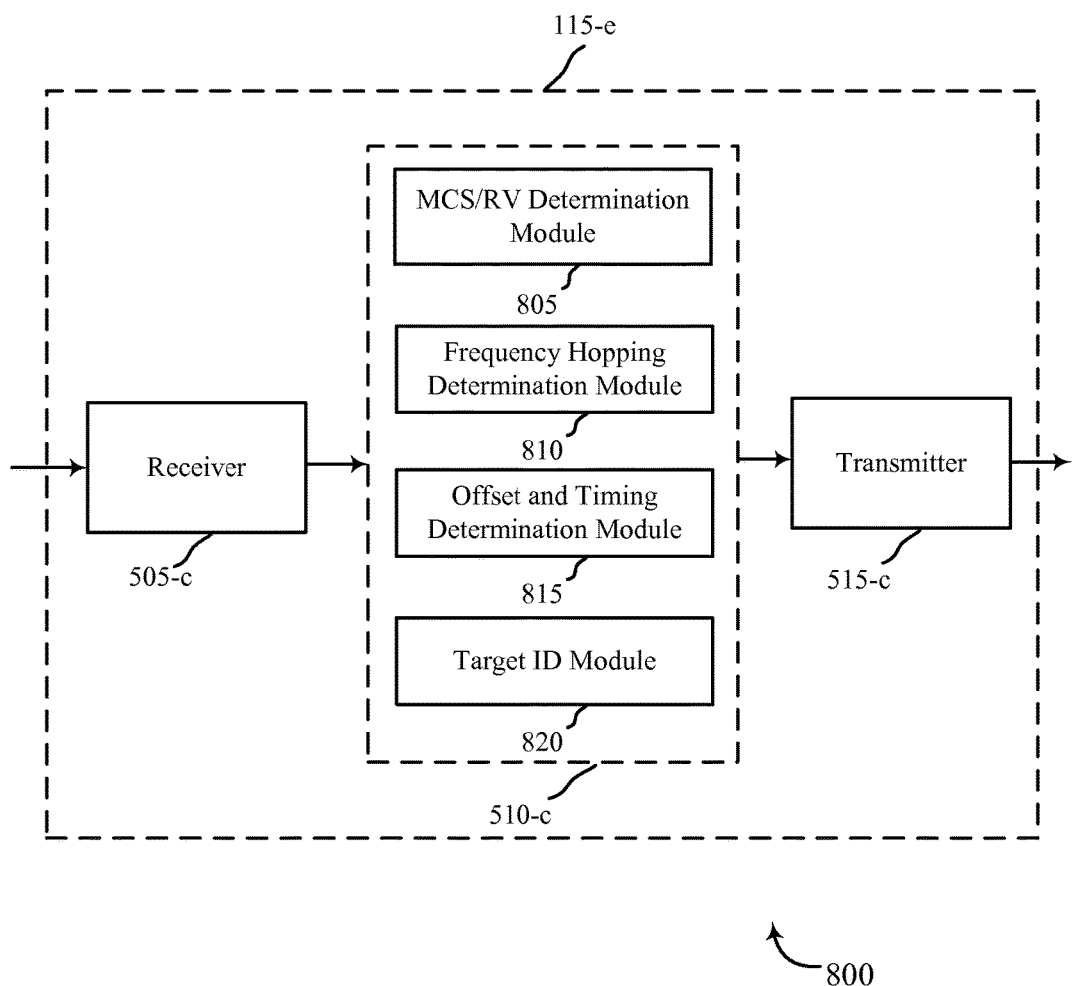
FIG. 8 shows a block diagram of a device for SA transmissions and content determination for SA transmissions in accordance with various aspects of the present disclosure.

FIG. 8 shows a block diagram 800 of a UE 115-e for transmitting or receiving SA and data transmissions in accordance with various aspects of the present disclosure. The UE 115-e may be an example of one or more aspects of a UE 115 described with reference to FIG. 1, 5, 6 or 7. The UE 115-e may include a receiver 505-c, an SA management module 510-c, or a transmitter 515-c. The UE 115-e may also include a processor. Each of these components may be in communication with each other. The SA management module 510-c may also include a MCS/RV determination module 805, a frequency hopping determination module 810, an offset and timing determination module 815, and a target ID module 820.

The components of the UE 115-e may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver 505-c may receive information which may be passed on to the SA management module 510-c, and to other components of the UE 115-e as described above with reference to FIG. 5, 6 or 7. The SA management module 510-c may be configured to perform the operations described above with reference to FIG. 5, 6, or 7. The transmitter 515-c may transmit the one or more signals received from other components of the UE 115-e. For example, in cases where UE 115-e is a D2D transmitting device, it may transmit SA and data transmissions using D2D communications to one or more receiving UEs.

The MCS/RV determination module 805 may be configured to determine MCS/RV for subsequent data transmissions following an SA transmission, in a similar manner as discussed above with respect to FIG. 4B, for example. The frequency hopping determination module 810 may be configured to determine SA retransmission frequency hopping patterns, in a similar manner as discussed above with respect to FIG. 2, 3A, 3B, 4A, 4B, or 4C. The offset and timing determination module 815 may be configured to determine SA transmission, SA retransmission, and data transmission timing in a similar manner as discussed above with respect to FIG. 2, 3A, 3B, 4A, 4B, or 4C. The target ID module 820 may be configured to determine a target ID, compress the target ID if needed, and scramble data transmissions based on the target ID, in a similar manner as discussed above with respect to FIG. 2, 3A, 3B, 4A, 4B, or 4C. The target ID module 820 may also be configured to decode scrambled data transmissions received at the UE 115-e based on information received in an SA, similarly as discussed above.

Figure 9:
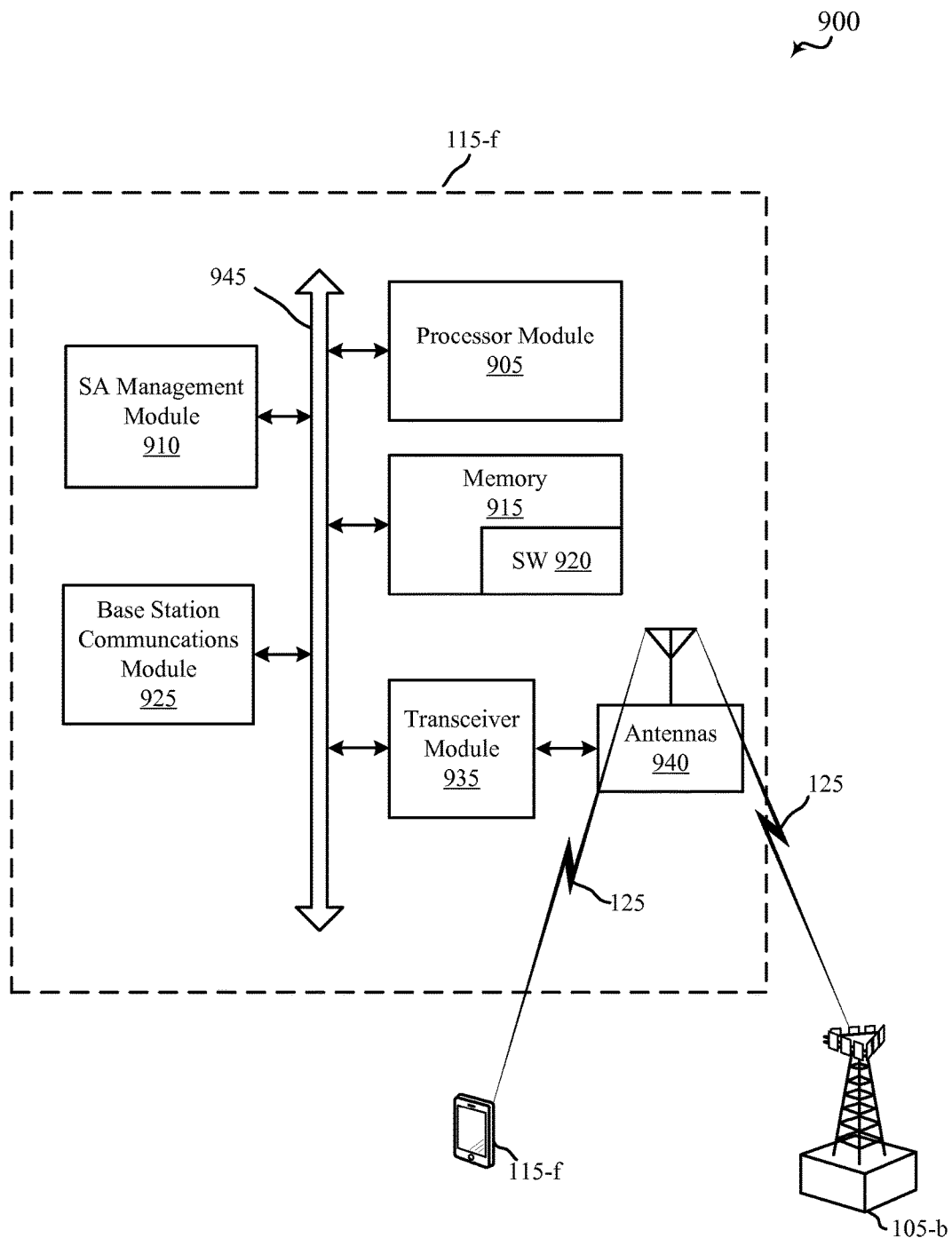
FIG. 9 illustrates a block diagram of a UE in a system for implementing SA transmissions and retransmissions in accordance with various aspects of the present disclosure.

FIG. 9 shows a diagram of a system 900 for transmitting or receiving SA and data transmissions in accordance with various aspects of the present disclosure. System 900 may include a UE 115-f, which may be an example of a UE 115 with reference to FIG. 1, 5, 6, 7, or 8. The UE 115-f may generally include components for bi-directional voice and data communications including components for transmitting communications and components for receiving communications.

The UE 115-f may include antenna(s) 940, a transceiver module 935, a processor module 905, and memory 915 (including software (SW) 920), which each may communicate, directly or indirectly, with each other (e.g., via one or more buses 945). The transceiver module 935 may be configured to communicate bi-directionally, via the antenna(s) 940 or one or more wired or wireless links, with one or more networks, as described above. For example, the transceiver module 935 may be configured to communicate bi-directionally with a base station 105. The transceiver module 935 may include a modem configured to modulate the packets and provide the modulated packets to the antenna(s) 940 for transmission, and to demodulate packets received from the antenna(s) 940. While the UE 115-f may include a single antenna 940, the UE 115-f may also have multiple antennas 940 capable of concurrently transmitting or receiving multiple wireless transmissions. The transceiver module 935 may also be capable of concurrently communicating with one or more base stations 105.

The memory 915 may include random access memory (RAM) and read-only memory (ROM). The memory 915 may store computer-readable, computer-executable software/firmware code 920 containing instructions that are configured to, when executed, cause the processor module 905 to perform various functions described herein (e.g., call processing, database management, processing of carrier mode indicators, reporting CSI, etc.). Alternatively, the software/firmware code 920 may not be directly executable by the processor module 905 but be configured to cause a computer (e.g., when compiled and executed) to perform functions described herein. The processor module 905 may include an intelligent hardware device, e.g., a central processing unit (CPU), a microcontroller, an application-specific integrated circuit (ASIC), etc. may include random access memory (RAM) and read-only memory (ROM).

The memory 915 may store computer-readable, computer-executable software/firmware code 920 containing instructions that are configured to, when executed, cause the processor module 905 to perform various functions described herein (e.g., call processing, database management, processing of carrier mode indicators, reporting CSI, etc.). Alternatively, the software/firmware code 920 may not be directly executable by the processor module 905 but be configured to cause a computer (e.g., when compiled and executed) to perform functions described herein. The processor module 905 may include an intelligent hardware device (e.g., a central processing unit (CPU), a microcontroller, an application-specific integrated circuit (ASIC), etc.). Base station communications module 925 may perform operations related to communications with one or more base stations.

The SA management module 910 may be configured to determine scheduling assignments for one or more data transmissions and perform operations related to SA and data transmissions as discussed above with respect to FIG. 2, 3A, 3B, 4A, 4B, 4C, 5, 6, 7, or 8. If UE 115-f is a D2D transmitting device, for example, the SA(s) may be determined for receiving UEs, and resources from an SA resource pool may be determined for transmission of the SA(s). Furthermore, SA management module 910 may determine a retransmission pattern for retransmissions of the SA(s), which may include one or both of a timing pattern and frequency hopping pattern for SA retransmissions, similarly as discussed above. If UE 115-f is a D2D receiving device, the SA management module 910 may monitor SA resources and determine if an SA transmission or retransmission are received. Based on the resources from the SA resource pool used for the SA transmissions(s), the SA management module 910 may determine an SA retransmission pattern and resources that are to be used for data transmissions, which may include one or both of a timing pattern and frequency hopping pattern, similarly as discussed above.

Figure 10:
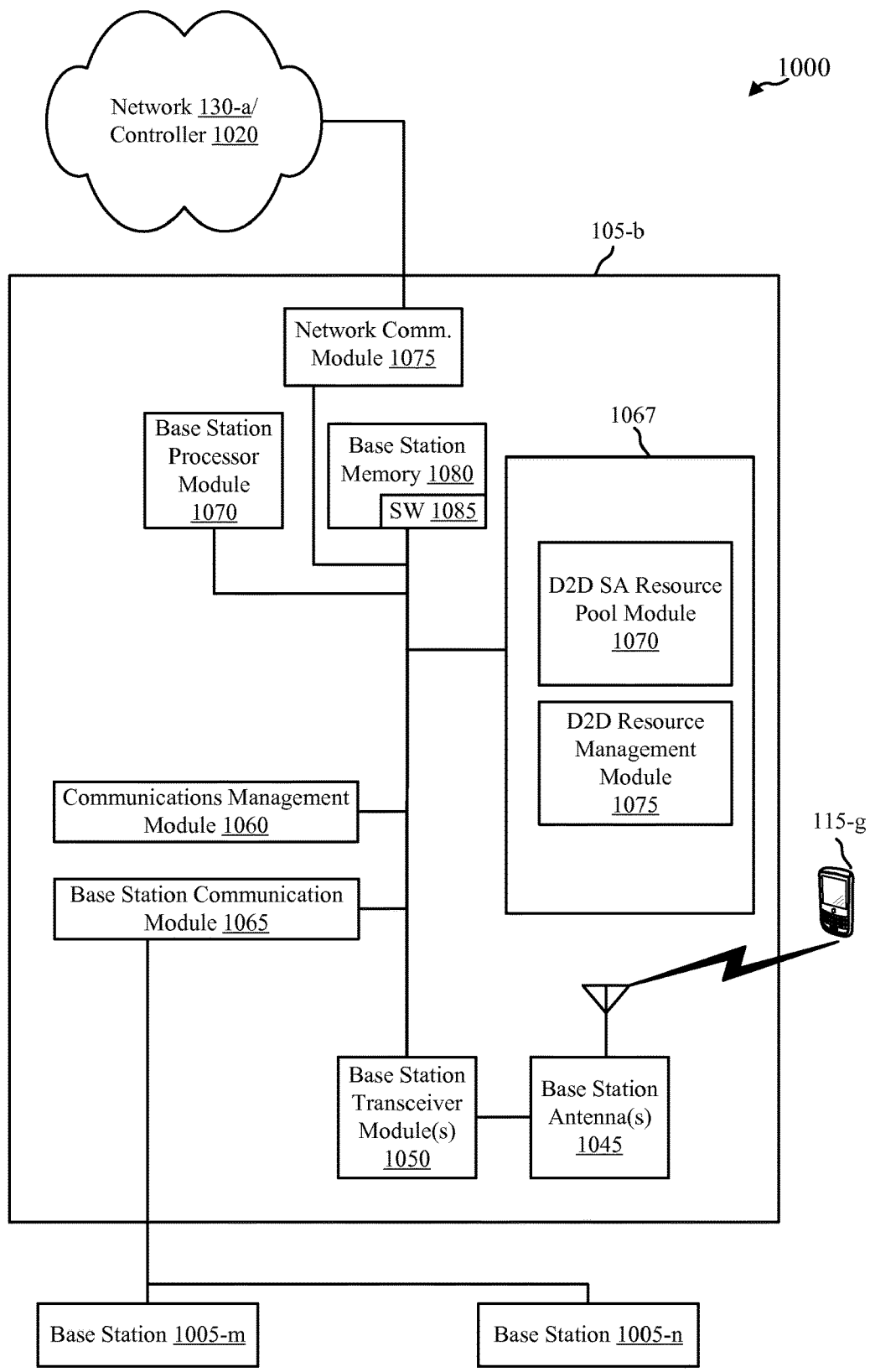
FIG. 10 illustrates a block diagram of a base station in a system for implementing SA transmissions and retransmissions in accordance with various aspects of the present disclosure.

FIG. 10 shows a block diagram of a communications system 1000 that may be configured for use in receiving and transmitting D2D communications, in accordance with various aspects of the present disclosure. The communications system 1000 may be an example of aspects of the wireless communications systems 100, or 900 depicted in FIG. 1 or 9, respectively. Communications system 1000 may include a base station 105-c. The base station 105-c may include base station antenna(s) 1045, a base station transceiver module 1050, base station memory 1080, and a base station processor module 1070, which each may be in communication, directly or indirectly, with each other (e.g., over one or more buses). The base station transceiver module 1050 may be configured to communicate bi-directionally, via the base station antenna(s) 1045, with a UE 115-g, which may be an example of a UE 115 of FIG. 1, 5, 6, 7, 8 or 9. The base station transceiver module 1050 (or other components of the base station 105-c) may also be configured to communicate bi-directionally with one or more networks. In some cases, the base station 105-c may communicate with the core network 130-a or controller 1020 through network communications module 1075. Base station 105-c may be an example of the base stations 105 of FIG. 1 or 9. Controller 1020 may be integrated into base station 105-c in some cases, such as with an eNodeB base station.

Base station 105-c may also communicate with other base stations 105, such as base station 105-m and base station 105-n. Each of the base stations 105 may communicate with the user device 115-g using different wireless communications technologies, such as different Radio Access Technologies. In some cases, base station 105-c may communicate with other base stations such as 105-m or 105-n utilizing base station communication module 1065. In some examples, base station communication module 1065 may provide an X2 interface within an LTE wireless communication technology to provide communication between some of the base stations 105. In some examples, base station 105-c may communicate with other base stations through controller 1020 or core network 130-a.

The base station memory 1080 may include random access memory (RAM) and read-only memory (ROM). The base station memory 1080 may also store computer-readable, computer-executable software code 1085 containing instructions that are configured to, when executed, cause the base station processor module 1070 to perform various functions described herein (e.g., receiving and transmitting D2D communications, and providing resource grants, timing information, and offset information for D2D communications). Alternatively, the software code 1085 may not be directly executable by the base station processor module 1070 but be configured to cause the computer, e.g., when compiled and executed, to perform functions described herein. The base station processor module 1070 may include an intelligent hardware device (e.g., a central processing unit (CPU), a microcontroller, an application-specific integrated circuit (ASIC), etc.).

The base station transceiver module 1050 may include a modem configured to modulate the packets and provide the modulated packets to the base station antenna(s) 1045 for transmission, and to demodulate packets received from the base station antenna(s) 1045. While some examples of the base station 105-c may include a single base station antenna 1045, the base station 105-c may include multiple base station antennas 1045 for multiple links which may support carrier aggregation. For example, one or more links may be used to support macro communications with the user device 115-g.

According to the architecture of FIG. 10, the base station 105-c may further include a communications management module 1060. The communications management module 1060 may manage communications with other base stations 105. As an example, the communications management module 1060 may facilitate the transmittal of a D2D information, such as grants to D2D transmitting devices, etc., as discussed above. By way of example, the communications management module 1060 may be a component of the base station 105-c in communication with some or all of the other components of the base station 105-c via a bus. Alternatively, functionality of the communications management module 1060 may be implemented as a component of the base station transceiver module 1050, as a computer-readable medium, or as one or more controller elements of the base station processor module 1070.

The components for base station 105-c may be configured to implement aspects discussed above with respect to FIG. 2, 3A, 3B, 4A, 4B, 4C, 5, 6, 7, 8, or 9, which are not be repeated here for the sake of brevity. For example, the base station 105-d may include a base station D2D module 1067. Base station D2D module 1067 may include a D2D SA resource pool module 1070 and D2D resource management module 1075, which may be configured to perform or control some or all of the base station related features or functions described with reference to FIG. 1, 2, 3A, 3B, 4A, 4B, 4C, 5, 6, 7, 8, or 9. The base station D2D module 1067, or portions of it, may include a processor, or some or all of the functions of the base station D2D module 1067 may be performed by the base station processor module 1070 or in connection with the base station processor module 1070. Additionally, the base station D2D module 1067, or portions of it, may include a memory, or some or all of the functions of the base station D2D module 1067 may use the base station memory 1080 or be used in connection with the base station memory 1080.

Figure 11:
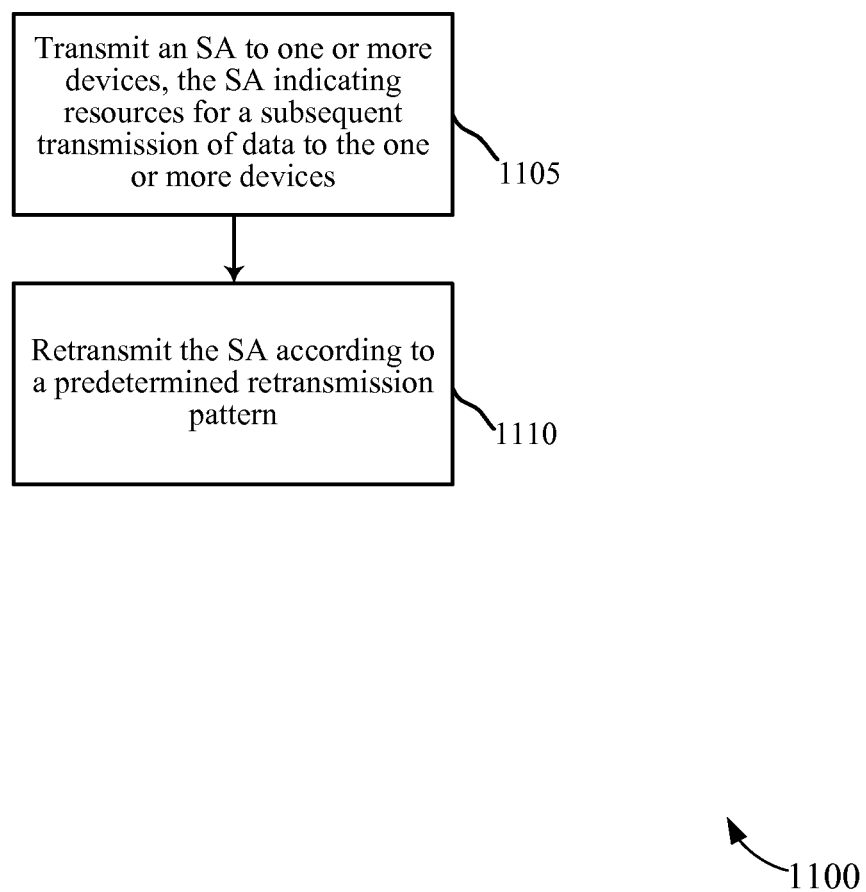
FIG. 11 shows a flowchart illustrating a method for SA transmissions and retransmissions in accordance with various aspects of the present disclosure.

FIG. 11 shows a flowchart 1100 illustrating a method for SA transmission and retransmissions in accordance with various aspects of the present disclosure. The functions of flowchart 1100 may be implemented by a transmitting device, such as a UE 115 or its components as described with reference to FIG. 1, 5, 6, 7, 8, 9, or 10. In some examples, a device, such as one of the UEs 115, may execute one or more sets of codes to control the functional elements of the device to perform the functions described below.

At block 1105, an SA is transmitted to one or more devices, the SA indicating resources for a subsequent transmission of data to the one or more devices. For example, a transmitting UE may transmit an SA in a broadcast D2D transmission to one or more receiving UEs. At block 1110, the SA is retransmitted according to a predetermined retransmission pattern. The predefined retransmission pattern may be a time-based repeating pattern for a number or retransmissions (e.g., three retransmissions each 4 ms following the immediate prior transmission). The predefined retransmission pattern may also be a frequency hopping pattern, in which one or more retransmissions use different frequency resources. Such retransmissions may enhance the likelihood of successful reception of the SA at the receiving device.

It should be noted that the method of flowchart 1100 is just one implementation and that the operations of the method, and the steps may be rearranged or otherwise modified such that other implementations are possible.

Figure 12:
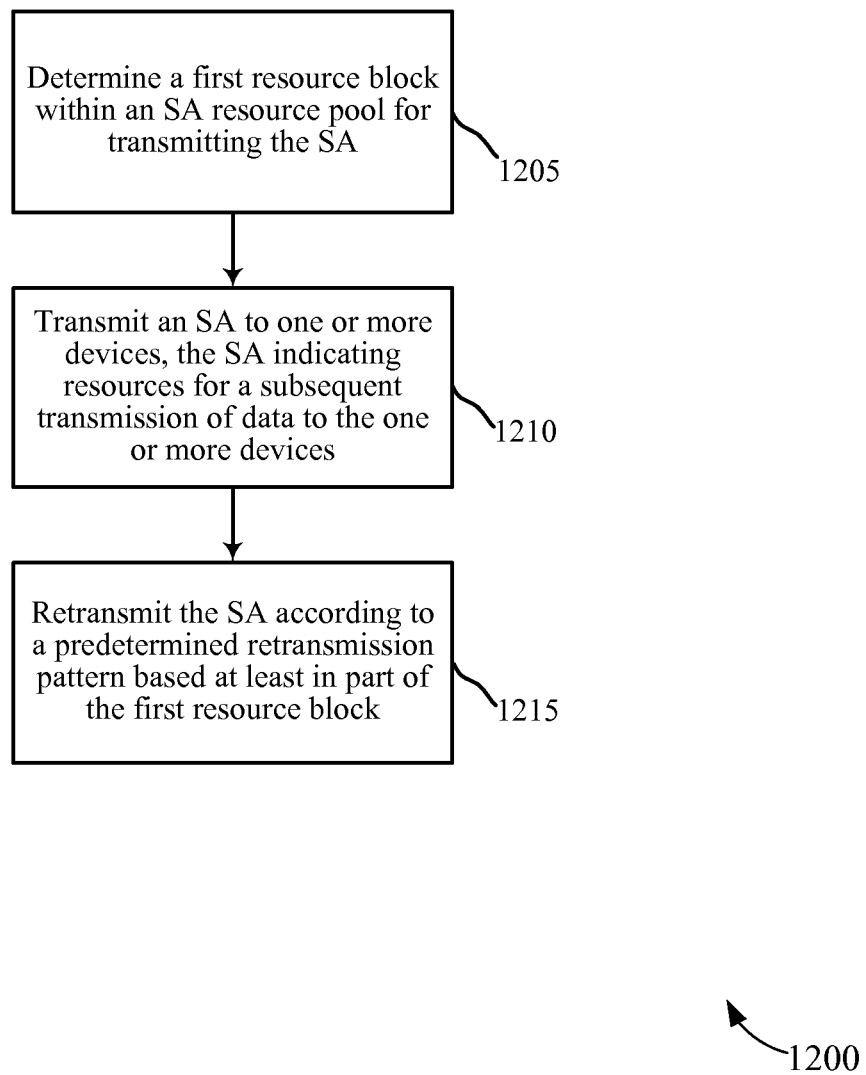
FIG. 12 shows another flowchart illustrating a method for SA transmissions and retransmissions in accordance with various aspects of the present disclosure.

FIG. 12 shows a flowchart 1200 illustrating a method for SA transmission and retransmissions in accordance with various aspects of the present disclosure. The functions of flowchart 1200 may be implemented by a transmitting device, such as a UE 115 or its components as described with reference to FIG. 1, 5, 6, 7, 8, 9, or 10. In some examples, a device, such as one of the UEs 115, may execute one or more sets of codes to control the functional elements of the device to perform the functions described below.

At block 1205, a first resource block within an SA resource pool for transmitting an SA is determined. At block 1210, the SA is transmitted to one or more devices, the SA indicating resources for a subsequent transmission of data to the one or more devices. At block 1215, the SA is retransmitted according to a predetermined retransmission pattern that is based at least in part on the first resource block. Thus, different predefined retransmission patterns may be associated with different resource blocks within the SA resource pool. Such patterns may be transmitted, for example, in a SIB or may be defined in a standard, to name two exemplary options for defining the retransmission patterns. Such retransmissions may enhance the likelihood of successful reception of the SA at the receiving device.

It should be noted that the method of flowchart 1200 is just one implementation and that the operations of the method, and the steps may be rearranged or otherwise modified such that other implementations are possible.

Figure 13:
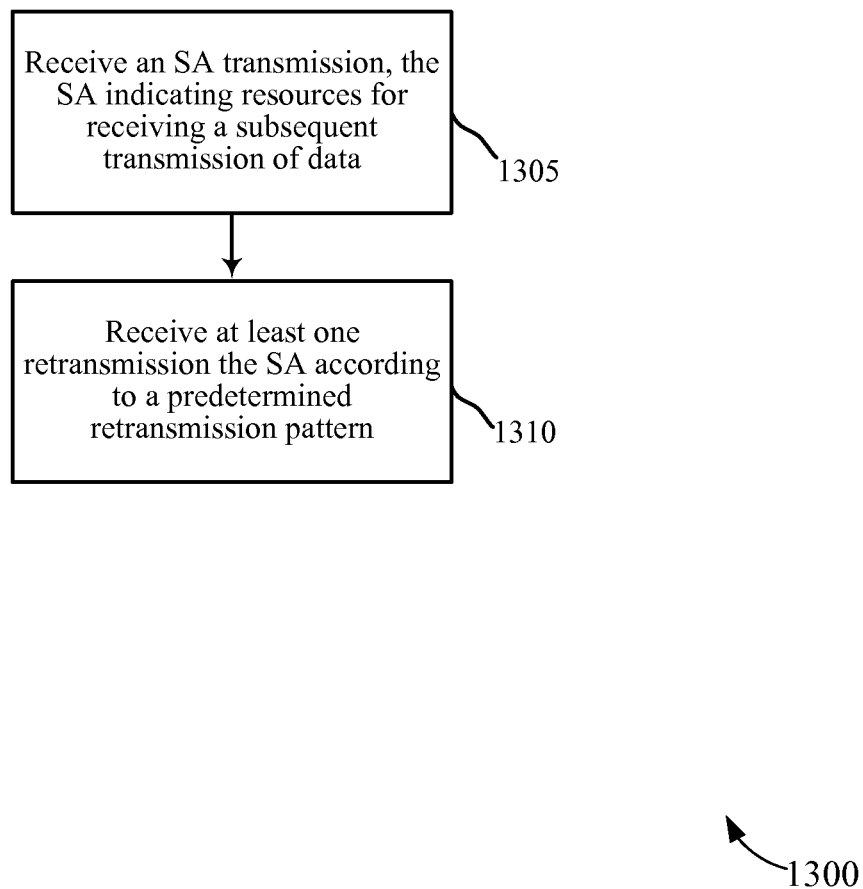
FIG. 13 shows another flowchart illustrating a method for SA transmissions and retransmissions in accordance with various aspects of the present disclosure.

FIG. 13 shows a flowchart 1300 illustrating a method for SA transmission and retransmissions in accordance with various aspects of the present disclosure. The functions of flowchart 1300 may be implemented by a receiving device, such as a UE 115 or its components as described with reference to FIG. 1, 5, 6, 7, 8, 9, or 10. In some examples, a device, such as one of the UEs 115, may execute one or more sets of codes to control the functional elements of the device to perform the functions described below.

At block 1305, an SA transmission is received, the SA indicating resources for receiving a subsequent transmission of data. At block 1310, at least one retransmission of the SA is received according to a predetermined retransmission pattern. The predefined retransmission pattern may be a time-based repeating pattern for a number or retransmissions (e.g., three retransmissions each 4 ms following the immediate prior transmission). The predefined retransmission pattern may also be a frequency hopping pattern, in which one or more retransmissions use different frequency resources. Such retransmissions may enhance the likelihood of successful reception of the SA.

It should be noted that the method of flowchart 1300 is just one implementation and that the operations of the method, and the steps may be rearranged or otherwise modified such that other implementations are possible.

Figure 14:
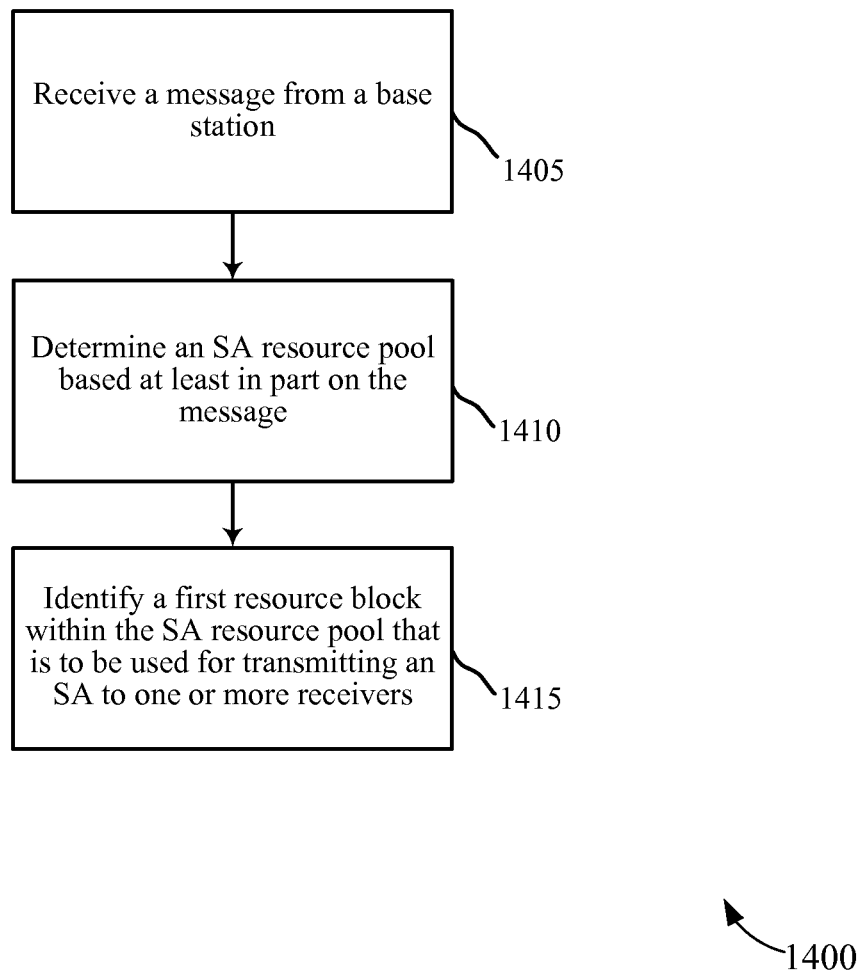
FIG. 14 shows another flowchart illustrating a method for SA transmissions and retransmissions in accordance with various aspects of the present disclosure.

FIG. 14 shows a flowchart 1400 illustrating a method for SA transmission and retransmissions in accordance with various aspects of the present disclosure. The functions of flowchart 1400 may be implemented by a transmitting device, such as a UE 115 or its components as described with reference to FIG. 1, 5, 6, 7, 8, 9, or 10. In some examples, a device, such as one of the UEs 115, may execute one or more sets of codes to control the functional elements of the device to perform the functions described below.

At block 1405, a message is received from a base station. The message may be received in, for example, a DCI or SIB transmission. At block 1410, an SA resource pool is determined based at least in part on the message. For example, a SIB may provide an indication of resources that are to be used for SA transmissions and retransmissions. Such a SIB may also indicate resources for transmission of data. At block 1415, a first resource block within the SA resource pool is identified, the first resource block used for transmitting an SA to one or more receivers. In some examples, different predefined retransmission patterns may be associated with different resource blocks within the SA resource pool.

It should be noted that the method of flowchart 1400 is just one implementation and that the operations of the method, and the steps may be rearranged or otherwise modified such that other implementations are possible.

The detailed description set forth above in connection with the appended drawings describes exemplary examples and does not represent the only examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communications, comprising:
   determining a first resource block within a first subframe of a scheduling assignment (SA) resource pool for transmitting an SA, the SA indicating resources for a subsequent transmission of data to one or more devices;
   transmitting the SA to the one or more devices during the first resource block; and
   retransmitting, independent of feedback for the SA transmission and before the subsequent transmission of data, the SA during a second resource block within a second subframe of the same SA resource pool according to a predetermined retransmission pattern such that a position of the second resource block within the second subframe is different from and based at least in part on a position of the first resource block within the first subframe.

2. The method of claim 1, wherein the SA is transmitted in a device-to-device (D2D) broadcast transmission.

3. The method of claim 1, wherein the retransmission pattern comprises a fixed frequency hopping pattern, a fixed time pattern, or a combination thereof.

4. The method of claim 3, wherein the fixed frequency hopping pattern, fixed time pattern, or combination thereof is indicated in a system information block (SIB) or is a predefined pattern.

5. The method of claim 1, wherein the retransmission pattern is based at least in part on the first resource block.

6. The method of claim 5, wherein the retransmission pattern identifies time diverse resources within the SA resource pool, or frequency diverse resources within the SA resource pool, or a combination thereof.

7. The method of claim 5, wherein the SA resource pool comprises a plurality of Long Term Evolution (LTE) subframes.

8. The method of claim 1, further comprising:
   receiving, from a base station, a grant for transmitting the SA.

9. The method of claim 8, wherein transmitting the SA comprises:
   determining the first resource block for transmitting the SA based at least in part on the grant.

10. The method of claim 9, wherein the grant comprises downlink control information (DCI) comprising an index that identifies the first resource block within the SA resource pool.

11. The method of claim 10, wherein the index is included in a resource block assignment field of the DCI.

12. The method of claim 1, wherein the SA comprises a modulation and coding scheme (MCS) and a redundancy version (RV) for the subsequent transmission of data.

13. The method of claim 1, wherein the SA comprises a frequency hopping pattern for the subsequent transmission of data.

14. The method of claim 1, wherein the SA comprises a target identification (ID) for the subsequent transmission of data, and wherein the subsequent transmission of data is scrambled using the target ID.

15. The method of claim 1, wherein the SA comprises an offset for a first data transmission with respect to the transmission of the SA.

16. The method of claim 1, wherein the SA further comprises a cyclic redundancy check (CRC) scrambled by a target identification (ID).

17. The method of claim 1, wherein the SA comprises an indicator of a last SA transmission.

18. An apparatus for wireless communications, comprising:
   means for determining a first resource block within a first subframe of scheduling assignment (SA) resource pool for transmitting an SA, the SA indicating resources for a subsequent transmission of data to one or more devices;
   means for transmitting the SA to the one or more devices during the first resource block; and
   means for retransmitting, independent of feedback for the SA transmission and before the subsequent transmission of data, the SA during a second resource block within a second subframe of the same SA resource pool according to a predetermined retransmission pattern such that a position of the second resource block within the second subframe is different from and based at least in part on a position of the first resource block within the first subframe.

19. The apparatus of claim 18, wherein the SA is transmitted in a device-to-device (D2D) broadcast transmission.

20. The apparatus of claim 18, wherein the retransmission pattern comprises a fixed frequency hopping pattern, a fixed time pattern, or a combination thereof.

21. The apparatus of claim 20, wherein the fixed frequency hopping pattern, fixed time pattern, or combination thereof is indicated in a system information block (SIB) or is a predefined pattern.

22. The apparatus of claim 18, wherein the retransmission pattern is based at least in part on the first resource block.

23. The apparatus of claim 22, wherein the retransmission pattern identifies time diverse resources within the SA resource pool, or frequency diverse resources within the SA resource pool, or a combination thereof.

24. The apparatus of claim 22, wherein the SA resource pool comprises a plurality of Long Term Evolution (LTE) subframes.

25. The apparatus of claim 18, further comprising:
   means for receiving, from a base station, a grant for transmitting the SA.

26. The apparatus of claim 25, wherein the means for transmitting the SA determines the first resource block for transmitting the SA based at least in part on the grant.

27. The apparatus of claim 26, wherein the grant comprises downlink control information (DCI) comprising an index that identifies the first resource block within the SA resource pool.

28. The apparatus of claim 27, wherein the index is included in a resource block assignment field of the DCI.

29. The apparatus of claim 18, wherein the SA comprises one or more of:
   a modulation and coding scheme (MCS) and a redundancy version (RV) for the subsequent transmission(s) of data;
   a frequency hopping pattern for the subsequent transmission of data;
   a target identification (ID) for the subsequent transmission of data;
   an offset for a first data transmission with respect to the transmission of the SA;
   a cyclic redundancy check (CRC) scrambled by the target ID; or
   an indicator of a last SA transmission.

30. An apparatus for wireless communications, comprising:
   a processor;

memory in electronic communication with the processor; and instructions stored in the memory, the instructions being executable by the processor to:

determine a first resource block within a first subframe of a scheduling assignment (SA) resource pool for transmitting an SA, the SA indicating resources for a subsequent transmission of data to one or more devices;

transmit the SA to the one or more devices during the first resource block; and retransmit, independent of feedback for the SA transmission and before the subsequent transmission of data, the SA during a second resource block within a second subframe of the same SA resource pool according to a predetermined retransmission pattern such that a position of the second resource block within the second subframe is different from and based at least in part on a position of the first resource block within the first subframe.

31. The apparatus of claim 30, wherein the retransmission pattern comprises a fixed frequency hopping pattern, a fixed time pattern, or a combination thereof.

32. The apparatus of claim 31, wherein the fixed frequency hopping pattern, fixed time pattern, or combination thereof is indicated in a system information block (SIB) or is a predefined pattern.

33. The apparatus of claim 30, wherein the retransmission pattern is based at least in part on the first resource block.

34. The apparatus of claim 30, wherein the SA comprises one or more of:

a modulation and coding scheme (MCS) and a redundancy version (RV) for the subsequent transmission(s) of data;

a frequency hopping pattern for the subsequent transmission of data;

a target identification (ID) for the subsequent transmission of data; or an offset for a first data transmission with respect to the transmission of the SA.

35. A non-transitory computer-readable medium storing instructions executable by a processor to:

determine a first resource block within a first subframe of a scheduling assignment (SA) resource pool for transmitting an SA, the SA indicating resources for a subsequent transmission of data to one or more devices;

transmit the SA to the one or more devices during the first resource block; and retransmit, independent of feedback for the SA transmission and before the subsequent transmission of data, the SA during a second resource block within a second subframe of the same SA resource pool according to a predetermined retransmission pattern such that a position of the second resource block within the second subframe is different from and based at least in part on a position of the first resource block within the first subframe.

36. The non-transitory computer-readable medium of claim 35, wherein the retransmission pattern comprises a fixed frequency hopping pattern, a fixed time pattern, or a combination thereof.

37. The non-transitory computer-readable medium of claim 35, wherein the retransmission pattern is based at least in part on the first resource block.

38. The non-transitory computer-readable medium of claim 35, wherein the SA comprises one or more of:

a modulation and coding scheme (MCS) and a redundancy version (RV) for the subsequent transmission(s) of data;

a frequency hopping pattern for the subsequent transmission of data;

a target identification (ID) for the subsequent transmission of data; or an offset for a first data transmission with respect to the transmission of the SA.

39. A method of wireless communications, comprising:

receiving a message from a base station;

determining a scheduling assignment (SA) resource pool based at least in part on the message;

identifying a first resource block within a first subframe of the SA resource pool that is to be used for transmitting an SA to one or more receivers, the SA indicating resources for a subsequent transmission of data to the one or more receivers;

transmitting the SA to the one or more receivers during the first resource block; and retransmitting, independent of feedback for the SA transmission and before the subsequent transmission of data, the SA during a second resource block within a second subframe of the same SA resource pool according to a predetermined retransmission pattern such that a position of the second resource block within the second subframe is different from and based at least in part on a position of the first resource block within the first subframe.

40. The method of claim 39, wherein the SA indicates resources for a subsequent transmission of data to the one or more receivers.

41. The method of claim 39, wherein the SA is transmitted in a device-to-device (D2D) broadcast transmission.

42. The method of claim 39, wherein the SA indicates resources for a subsequent transmission of data to the one or more receivers.

43. The method of claim 39, wherein the retransmission pattern comprises a fixed frequency hopping pattern, a fixed time pattern, or a combination thereof.

44. The method of claim 43, wherein the fixed frequency hopping pattern, the fixed time pattern, or combination thereof, is indicated in a system information block (SIB) or is a predefined pattern.

45. The method of claim 39, wherein the retransmission pattern identifies time diverse resources within the SA resource pool, or frequency diverse resources within the SA resource pool, or a combination thereof.

46. The method of claim 39, wherein SA resource pool comprises a plurality of Long Term Evolution (LTE) subframes.

47. The method of claim 39, wherein the message comprises downlink control information (DCI) comprising an index that identifies the first resource block in the SA resource pool.

48. The method of claim 47, wherein the index is included in a resource block assignment field of the DCI.

49. The method of claim 39, wherein the SA comprises a modulation and coding scheme (MCS) and a redundancy version (RV) for the subsequent transmission of data.

50. The method of claim 39, wherein the SA comprises a frequency hopping pattern for the subsequent transmission of data.

51. The method of claim 39, wherein the SA comprises a target identification (ID) for the subsequent transmission of data, and wherein the subsequent transmission of data is scrambled using the target ID.

52. The method of claim 39, wherein the SA comprises an offset for a first data transmission with respect to the transmission of the SA.

53. An apparatus for wireless communications, comprising:
  means for receiving a message from a base station;
  means for determining a scheduling assignment (SA) resource pool based at least in part on the message;
  means for identifying a first resource block within a first subframe of the SA resource pool that is to be used for transmitting an SA to one or more receivers, the SA indicating resources for a subsequent transmission of data to the one or more receivers;
  means for transmitting the SA to the one or more receivers during the first resource block; and
  means for retransmitting, independent of feedback for the SA transmission and before the subsequent transmission of data, the SA during a second resource block within a second subframe of the same SA resource pool according to a predetermined retransmission pattern such that a position of the second resource block within the second subframe is different from and based at least in part on a position of the first resource block within the first subframe.

54. The apparatus of claim 53, wherein the SA indicates resources for a subsequent transmission of data to the one or more receivers.

55. The apparatus of claim 53, wherein the SA is transmitted in a device-to-device (D2D) broadcast transmission.

56. The apparatus of claim 53, wherein the retransmission pattern comprises a fixed frequency hopping pattern, a fixed time pattern, or a combination thereof.

57. The apparatus of claim 56, wherein the fixed frequency hopping pattern, the fixed time pattern, or combination thereof, is indicated in a system information block (SIB) or is a predefined pattern.

58. The apparatus of claim 53, wherein the retransmission pattern identifies time diverse resources within the SA resource pool, or frequency diverse resources within the SA resource pool, or a combination thereof.

59. The apparatus of claim 53, wherein SA resource pool comprises a plurality of Long Term Evolution (LTE) subframes.

60. The apparatus of claim 53, wherein the message comprises downlink control information (DCI) comprising an index that identifies the first resource block in the SA resource pool.

61. The apparatus of claim 60, wherein the index is included in a resource block assignment field of the DCI.

62. The apparatus of claim 53, wherein the SA comprises a modulation and coding scheme (MCS) and a redundancy version (RV) for the subsequent transmission of data.

63. The apparatus of claim 53, wherein the SA comprises a frequency hopping pattern for the subsequent transmission of data.

64. The apparatus of claim 53, wherein the SA comprises a target identification (ID) for the subsequent transmission of data, and wherein the subsequent transmission of data is scrambled using the target ID.

65. The apparatus of claim 53, wherein the SA comprises an offset for a first data transmission with respect to the transmission of the SA.

66. An apparatus for wireless communications, comprising:
  a processor;
  memory in electronic communication with the processor; and
  instructions stored in the memory, the instructions being executable by the processor to:
    receive a message from a base station;
    determine a scheduling assignment (SA) resource pool based at least in part on the message;
    identify a first resource block within a first subframe of the SA resource pool that is to be used for transmitting an SA to one or more receivers, the SA indicating resources for a subsequent transmission of data to the one or more receivers;
    transmit the SA to the one or more receivers during the first resource block; and
    retransmit, independent of feedback for the SA transmission and before the subsequent transmission of data, the SA during a second resource block within a second subframe of the same SA resource pool according to a predetermined retransmission pattern such that a position of the second resource block within the second subframe is different from and based at least in part on a position of the first resource block within the first subframe.

67. The apparatus of claim 66, wherein the SA indicates resources for a subsequent transmission of data to the one or more receivers.

68. The apparatus of claim 66, wherein the message comprises downlink control information (DCI) comprising an index that identifies the first resource block in the SA resource pool.

69. The apparatus of claim 66, wherein the SA comprises one or more of:
  a modulation and coding scheme (MCS) and a redundancy version (RV) for the subsequent transmission of data;
  a frequency hopping pattern for the subsequent transmission of data;
  a target identification (ID) for the subsequent transmission of data; or
  an offset for a first data transmission with respect to the transmission of the SA.

70. A non-transitory computer-readable medium storing instructions executable by a processor to:
  receive a message from a base station;
  determine a scheduling assignment (SA) resource pool based at least in part on the message;
  identify a first resource block within a first subframe of the SA resource pool that is to be used for transmitting an SA to one or more receivers, the SA indicating resources for a subsequent transmission of data to the one or more receivers;
  transmit the SA to the one or more receivers during the first resource block; and
  retransmit, independent of feedback for the SA transmission and before the subsequent transmission of data, the SA during a second resource block within a second subframe of the same SA resource pool according to a predetermined retransmission pattern such that a position of the second resource block within the second subframe is different from and based at least in part on a position of the first resource block within the first subframe.

71. The non-transitory computer-readable medium of claim 70, wherein the SA indicates resources for a subsequent transmission of data to the one or more receivers.

72. The non-transitory computer-readable medium of claim 70, wherein the message comprises downlink control information (DCI) comprising an index that identifies the first resource block in the SA resource pool.

73. The non-transitory computer-readable medium of claim 70, wherein the SA comprises one or more of:
- a modulation and coding scheme (MCS) and a redundancy version (RV) for the subsequent transmission of data;
- a frequency hopping pattern for the subsequent transmission of data;
- a target identification (ID) for the subsequent transmission of data; or
- an offset for a first data transmission with respect to the transmission of the SA.

74. A method of wireless communications, comprising:
receiving a scheduling assignment (SA) transmission, the SA indicating resources for receiving a subsequent transmission of data;
determining a first resource block within a first subframe of an SA resource pool during which the SA transmission is received; and
receiving, independent of feedback for the SA transmission and before receiving the subsequent transmission of data, at least one retransmission of the SA during a second resource block within a second subframe of the same SA resource pool according to a predetermined retransmission pattern, wherein a position of the second resource block within the second subframe is different from and based at least in part on a position of the first resource block within the first subframe.

75. The method of claim 74, further comprising:
combining the SA transmission and the at least one retransmission to determine the SA.

76. The method of claim 74, wherein the SA is transmitted in a device-to-device (D2D) broadcast transmission.

77. The method of claim 74, wherein the predetermined retransmission pattern comprises a fixed frequency hopping pattern, a fixed time pattern, or a combination thereof.

78. The method of claim 77, wherein the fixed frequency hopping pattern, fixed time pattern, or combination thereof is indicated in a system information block (SIB) received from a transmitting device, or is a predefined pattern.

79. The method of claim 74, wherein the retransmission pattern is based at least in part on the first resource block.

80. The method of claim 74, wherein the SA comprises a modulation and coding scheme (MCS) and a redundancy version (RV) for the subsequent transmission of data.

81. The method of claim 74, wherein the SA comprises a frequency hopping pattern for the subsequent transmission of data.

82. The method of claim 74, wherein the SA comprises a target identification (ID) for the subsequent transmission of data, and wherein the subsequent transmission of data is scrambled using the target ID.

83. The method of claim 74, wherein the SA further comprises a cyclic redundancy check (CRC) scrambled by a target identification (ID).

84. The method of claim 74, wherein the SA comprises an offset for a first data transmission with respect to the SA resource pool or the transmission of the SA.

85. An apparatus for wireless communications, comprising:
means for receiving a scheduling assignment (SA) transmission, the SA indicating resources for receiving a subsequent transmission of data;
means for determining a first resource block within a first subframe of an SA resource pool during which the SA transmission is received; and
means for receiving, independent of feedback for the SA transmission and before receiving the subsequent transmission of data, at least one retransmission of the SA during a second resource block within a second subframe of the same SA resource pool according to a predetermined retransmission pattern, wherein a position of the second resource block within the second subframe is different from and based at least in part on a position of the first resource block within the first subframe.

86. The apparatus of claim 85, further comprising:
means for combining the SA transmission and the at least one retransmission to determine the SA.

87. The apparatus of claim 85, wherein the SA is transmitted in a device-to-device (D2D) broadcast transmission.

88. The apparatus of claim 85, wherein the predetermined retransmission pattern comprises a fixed frequency hopping pattern, a fixed time pattern, or a combination thereof.

89. The apparatus of claim 88, wherein the fixed frequency hopping pattern, fixed time pattern, or combination thereof is indicated in a system information block (SIB) received from a transmitting device, or is a predefined pattern.

90. The apparatus of claim 85, wherein the retransmission pattern is based at least in part on the first resource block.

91. The apparatus of claim 85, wherein the SA comprises one or more of:
- a modulation and coding scheme (MCS) and a redundancy version (RV) for the subsequent transmission of data;
- a frequency hopping pattern for the subsequent transmission of data;
- a target identification (ID) for the subsequent transmission of data, and wherein the subsequent transmission of data is scrambled using the target ID; or
- an offset for a first data transmission with respect to the SA resource pool or the transmission of the SA.

92. An apparatus for wireless communications, comprising:
a processor;
memory in electronic communication with the processor; and
instructions stored in the memory, the instructions being executable by the processor to:
receive a scheduling assignment (SA) transmission, the SA indicating resources for receiving a subsequent transmission of data;
determine a first resource block within a first subframe of an SA resource pool during which the SA transmission is received; and
receive, independent of feedback for the SA transmission and before receiving the subsequent transmission of data, at least one retransmission of the SA during a second resource block within a second subframe of the same SA resource pool according to a predetermined retransmission pattern, wherein a position of the second resource block within the second subframe is different from and based at least in part on a position of the first resource block within the first subframe.

93. The apparatus of claim 92, wherein the predetermined retransmission pattern comprises a fixed frequency hopping pattern, a fixed time pattern, or a combination thereof.

94. The apparatus of claim 93, wherein the fixed frequency hopping pattern, fixed time pattern, or combination thereof is indicated in a system information block (SIB) received from a transmitting device, or is a predefined pattern.

95. The apparatus of claim 92, wherein the retransmission pattern is based at least in part on the first resource block.

96. The apparatus of claim 92, wherein the SA comprises one or more of:
- a modulation and coding scheme (MCS) and a redundancy version (RV) for the subsequent transmission of data;
- a frequency hopping pattern for the subsequent transmission of data;
- a target identification (ID) for the subsequent transmission of data, and wherein the subsequent transmission of data is scrambled using the target ID; or
- an offset for a first data transmission with respect to the SA resource pool or the transmission of the SA.

97. A non-transitory computer-readable medium storing instructions executable by a processor to:
- receive a scheduling assignment (SA) transmission, the SA indicating resources for receiving a subsequent transmission of data;
- determine a first resource block within a first subframe of an SA resource pool during which the SA transmission is received; and
- receive, independent of feedback for the SA transmission and before receiving the subsequent transmission of data, at least one retransmission of the SA during a second resource block within a second subframe of the same SA resource pool according to a predetermined retransmission pattern, wherein a position of the second resource block within the second subframe is different from and based at least in part on a position of the first resource block within the first subframe.

98. The non-transitory computer-readable medium of claim 97, wherein the predetermined retransmission pattern comprises a fixed frequency hopping pattern, a fixed time pattern, or a combination thereof.

99. The non-transitory computer-readable medium of claim 98, wherein the fixed frequency hopping pattern, fixed time pattern, or combination thereof is indicated in a system information block (SIB) received from a transmitting device, or is a predefined pattern.

100. The non-transitory computer-readable medium of claim 97, wherein the retransmission pattern is based at least in part on the first resource block.

101. The non-transitory computer-readable medium of claim 97, wherein the SA comprises one or more of:
- a modulation and coding scheme (MCS) and a redundancy version (RV) for the subsequent transmission of data;
- a frequency hopping pattern for the subsequent transmission of data;
- a target identification (ID) for the subsequent transmission of data, and wherein the subsequent transmission of data is scrambled using the target ID; or
- an offset for a first data transmission with respect to the SA resource pool or the transmission of the SA.

102. The method of claim 1, further comprising:
determining, prior to transmitting the SA, to retransmit the SA.

* * * * *